United States Patent
Dara et al.

(10) Patent No.: US 10,211,987 B2
(45) Date of Patent: *Feb. 19, 2019

(54) TRANSPORT MECHANISM FOR CARRYING IN-BAND METADATA FOR NETWORK PATH PROOF OF TRANSIT

(71) Applicant: Cisco Technology, Inc., San Jose, CA (US)

(72) Inventors: Venkata Krishna Sashank Dara, Karnataka (IN); Shwetha Subray Bhandari, Karnataka (IN); Andrew Yourtchenko, Brabant (BE); Eric Vyncke, Brabant (BE); Frank Brockners, Köln (DE)

(73) Assignee: Cisco Technology, Inc., San Jose, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 14/992,114

(22) Filed: Jan. 11, 2016

(65) Prior Publication Data

US 2016/0315819 A1 Oct. 27, 2016

(30) Foreign Application Priority Data

Apr. 27, 2015 (IN) .................. 1682/MUM/2015

(51) Int. Cl.
*H04L 9/32* (2006.01)
*H04L 12/24* (2006.01)
(Continued)

(52) U.S. Cl.
CPC ............ *H04L 9/32* (2013.01); *H04L 12/4633* (2013.01); *H04L 41/0853* (2013.01);
(Continued)

(58) Field of Classification Search
CPC ..... H04L 12/4633; H04L 12/24; H04L 12/46; H04L 12/743; H04L 12/741; H04L 12/28;
(Continued)

(56) References Cited

U.S. PATENT DOCUMENTS 6,751,221 B1 * 6/2004 Saito .................. H04L 12/2803
370/392
2008/0144836 A1 * 6/2008 Sanders ................. H04L 9/085
380/278
(Continued)

FOREIGN PATENT DOCUMENTS

WO 99/62221 A1 12/1999

OTHER PUBLICATIONS

Morris Dworkin, "Recommendations for Block Cipher Modes of Operation", Methods and Techniques, NIST Special Publication 800-38A, 2001 Edition, Dec. 2001, 66 pages.
(Continued)

*Primary Examiner* — Andrew W Chriss
*Assistant Examiner* — Rasha K Fayed
(74) *Attorney, Agent, or Firm* — Edell, Shapiro & Finnan, LLC

(57) ABSTRACT

A system and methods are provided herein for verifying proof of transit of traffic through a plurality of network nodes in a network. In one embodiment, a method is provided in which information is obtained about a packet at a network node in a network. The information includes in-band metadata. Verification information is read from the in-band metadata. The verification information for use in verifying a path of the packet in the network. Updated verification information is generated from the verification information read from the packet. The updated verification
(Continued)

information is written to the in-band metadata of the packet, and the packet is forwarded from the network node in the network.

20 Claims, 18 Drawing Sheets

(51) Int. Cl.
*H04L 12/46* (2006.01)
*H04L 29/06* (2006.01)
*H04L 29/12* (2006.01)
*H04L 12/721* (2013.01)

(52) U.S. Cl.
CPC .......... *H04L 41/0866* (2013.01); *H04L 45/26* (2013.01); *H04L 61/6059* (2013.01); *H04L 63/06* (2013.01); *H04L 63/12* (2013.01); *H04L 63/1408* (2013.01); *H04L 69/166* (2013.01); *H04L 69/22* (2013.01)

(58) Field of Classification Search
CPC ..... H04L 12/56; H04L 12/26; H04L 41/0853; H04L 41/0866; H04L 41/12; H04L 41/06; H04L 41/0809; H04L 41/0213; H04L 45/26; H04L 45/74; H04L 45/7453; H04L 45/745; H04L 45/00; H04L 45/04; H04L 69/22; H04L 69/166; H04L 61/6059; H04L 61/103; H04L 9/32; H04L 63/1408; H04L 63/12; H04L 63/06; H04L 63/1458; H04L 63/0236; H04L 63/1425; H04L 63/123; H04L 29/06; H04L 29/12; H04L 49/253; H04L 1/00; H04L 47/31; H04L 47/2483
USPC ......... 370/254, 392, 389, 395.3, 230.1, 231, 370/236, 235, 229, 230
See application file for complete search history.

(56) References Cited

U.S. PATENT DOCUMENTS

| | | | |
|---|---|---|---|
| 2009/0037713 A1 | 2/2009 | Khalid et al. | |
| 2009/0080422 A1* | 3/2009 | Lee ...................... | H04W 28/06 370/389 |
| 2010/0211787 A1 | 8/2010 | Bukshpun et al. | |
| 2011/0064093 A1* | 3/2011 | Mattson .................. | H04L 47/10 370/474 |
| 2011/0280394 A1 | 11/2011 | Hoover | |
| 2012/0087488 A1 | 4/2012 | Engels et al. | |
| 2012/0221854 A1* | 8/2012 | Orsini ................... | G06F 21/606 713/167 |
| 2013/0185815 A1 | 7/2013 | Leotsarakos | |
| 2013/0212235 A1 | 8/2013 | Fulton et al. | |
| 2013/0304604 A1* | 11/2013 | Hoffman ............. | G06Q 30/0621 705/26.5 |
| 2014/0198791 A1* | 7/2014 | Lim ........................ | H04L 45/00 370/392 |
| 2014/0337638 A1 | 11/2014 | Bemaudin et al. | |
| 2014/0362682 A1 | 12/2014 | Guichard et al. | |
| 2015/0063102 A1 | 3/2015 | Mestery et al. | |
| 2015/0092564 A1 | 4/2015 | Aldrin | |
| 2015/0131484 A1 | 5/2015 | Aldrin | |
| 2015/0195197 A1* | 7/2015 | Yong ........................ | H04L 45/74 370/392 |
| 2015/0227411 A1 | 8/2015 | Yi et al. | |
| 2015/0227930 A1 | 8/2015 | Quigley et al. | |
| 2015/0319490 A1* | 11/2015 | Besehanic ............ | H04N 21/258 725/19 |
| 2016/0080204 A1 | 3/2016 | Mishra et al. | |

OTHER PUBLICATIONS

"Shamir's Secret Sharing", Wikipedia, https://en.wikipedia.org/wiki/Shamir's_Secret_Sharing, downloaded from the Internet on Oct. 1, 2015, 4 pages.

S. Deering, et al., Request for Comments 2460, "Internet Protocol, Version 6 (IPv6)", Specification, Internet Working Group, Dec. 1998, 39 pages.

S. Previdi, Ed. et al., "IPv6 Segment Routing Header (SRH) draft-previdi-6man-segment-routing-header-07" Internet Draft, Network Working Group, Jul. 20, 2015, 33 pages.

International Search Report and Written Opinion in counterpart International Application No. PCT/US2016/028084, dated Nov. 28, 2016, 13 pages.

Frank Brockners, "Verify my service chain!", Cisco blog, Architects & Distinguished Engineers Discussions, XP-002761776, Jun. 3, 2015, 4 pages.

Frank Brockners, "What if you had a trip-recorder for all your traffic at line rate performance?", Cisco blog, Architects & Distinguished Engineers Discussions, XP-002761777, May 19, 2015, 3 pages.

F. Brockners, et al., "Service Chain Verification", DevNet-1084, Ciscolive!, Berlin, Germany, Feb. 15-19, 2016, XP009191657, 59 pages.

International Search Report and Written Opinion in counterpart International Application No. PCT/US2016/028084, dated Sep. 27, 2016, 13 pages.

* cited by examiner

280

282 — OBTAIN INFORMATION ABOUT A PACKET AT A NETWORK NODE

283 — READ THE FIRST VALUE AND THE SECOND VALUE FROM THE IN-BAND METADATA OF THE PACKET

284 — GENERATE, USING A CRYPTOGRAPHIC KEY THAT IS UNIQUE TO EACH RESPECTIVE NETWORK NODE, AN ENCRYPTION RESULT BASED ON THE FIRST VALUE

285 — GENERATE AN UPDATED SECOND VALUE BASED ON THE SECOND VALUE READ FROM THE PACKET AND THE ENCRYPTION RESULT

286 — WRITE THE UPDATED SECOND VALUE TO THE IN-BAND METADATA OF THE PACKET

287 — FORWARD THE PACKET IN THE NETWORK

TRANSPORT MECHANISM FOR CARRYING IN-BAND METADATA FOR NETWORK PATH PROOF OF TRANSIT

PRIORITY CLAIM

This application claims priority to Indian Provisional Patent Application No. 1682/MUM/2015, filed Apr. 27, 2015, the entirety of which is incorporated herein by reference.

TECHNICAL FIELD

The present disclosure relates to validating a packet has passed through a path in a network.

BACKGROUND

Service chains define a set of services or service functions (e.g., firewalls, Deep Packet Inspection, Layer 2 forwarding service, Layer 3 forwarding service, etc.), and their order (service1→service2) to be applied to selective packets as they are forwarded through a network. This is also referred to as service function chaining (SFC) and has been widely deployed by institutions, such as government agencies, organizations, companies. The security departments of such institutions may require a proof that packets of a certain application are processed in accordance with an institution's security policy. For example, if a packet flow is supposed to go through a series of service functions, a proof that all packets of the flow actually go through the service chain specified by the institution's policy is required. In case the packets of a flow are not properly processed, a network device, such as a domain edge device, would be required to identify the policy violation and take corresponding actions (e.g. drop or redirect the packet, send an alert etc.) corresponding to the institution's policy.

BRIEF DESCRIPTION OF THE DRAWINGS

FIG. 5 is a flow chart depicting operations performed at a network node for generating verification information using encryption techniques according to one example embodiment.

DESCRIPTION OF EXAMPLE EMBODIMENTS

Overview

A system and methods are provided herein for verifying proof of transit of traffic through a plurality of network nodes in a network. In one embodiment, a method is provided in which information is obtained about a packet at a network node in a network. The information includes in-band metadata. Verification information is read from the in-band metadata. The verification information for use in verifying a path of the packet in the network. Updated verification information is generated from the verification information read from the packet. The updated verification information is written to the in-band metadata of the packet, and the packet is forwarded from the network node in the network.

Detailed Description

There are various situations in networking environments when it is important to be able to verify that certain network traffic passes through a particular path in the network. This is referred to herein as proof of transit. There may be a plurality of network nodes associated with the particular path in the network. One example of such a situation is a service function chain, but there are numerous other examples. Currently, the proof that a packet traversed a particular service chain is typically delivered in an indirect way because service functions and network forwarding are performed in different trust domains. Physical hand-off-points are defined between these trust domains (i.e. physical interfaces).

The latest development in service chaining, for example, Network Functions Virtualization (NFV) and modern service chaining concepts (using virtual overlays such as Locator/ID Separation Protocol (LISP), Network Service Header (NSH)) etc., however, blurs the lines between the different trust domains, because the hand-off-points are no longer clearly defined physical interfaces but are virtual interfaces. Because of this, there are certain situations which require that no mixture of different trust layers in the same device be permitted and thus, NFV cannot be used in its current form.

Network Path Verification

In accordance with one embodiment, an overall system and solution is provided to verify/prove that a packet has transited a particular path in a network based on in-band metadata of the packet as it travels through network nodes. There are many applications for this technology, including without limitation, verifying that packets traverse certain service functions in a service function chain, verifying that packets pass through a Traffic Engineering (TE) route, etc.

Figure 1:
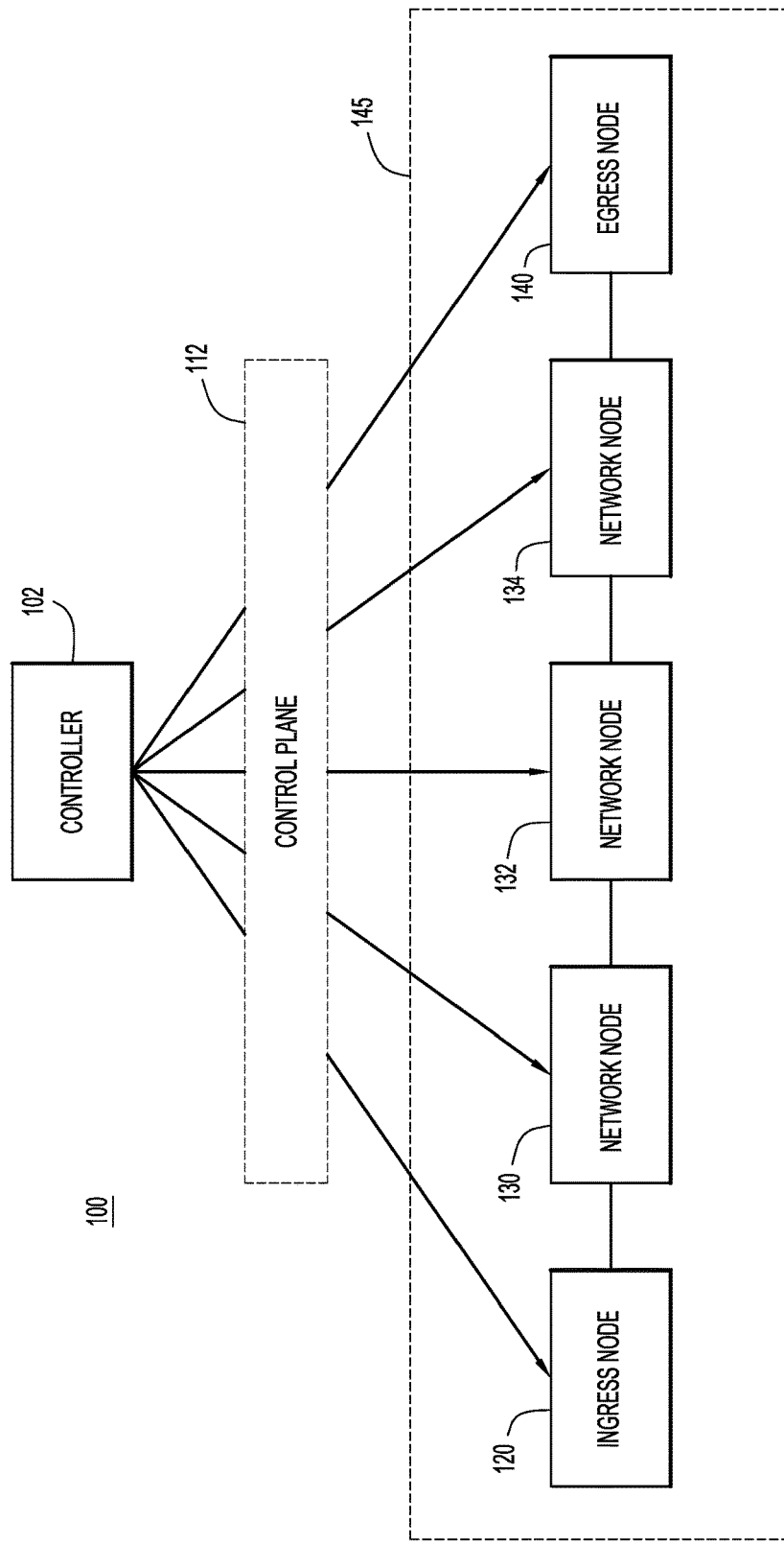
FIG. 1 is a diagram illustrating an example of network in which the path proof of transit verification techniques presented may be employed, in accordance with an example embodiment.

Referring first to FIG. 1, an example system 100 is shown that includes a plurality of network nodes. A controller 102 is connected to the network nodes. The controller 102 may be, for example, a Software Defined Networking (SDN) controller and may communicate with the plurality of network nodes via a control plane shown at reference numeral 112. The plurality of network nodes include an ingress node 120, network nodes 130, 132, 134 and an egress node 140. This simplified network topology is only an example and there may be many more (or fewer) network nodes. It is desired to verify that a packet has transited a path through network nodes 130, 132 and 134 in a network 145. There may be numerous other network nodes in network 145 through which a packet may travel between the ingress node 120 and egress node 140, but for simplicity these other network nodes are not shown in FIG. 1.

Figure 2:
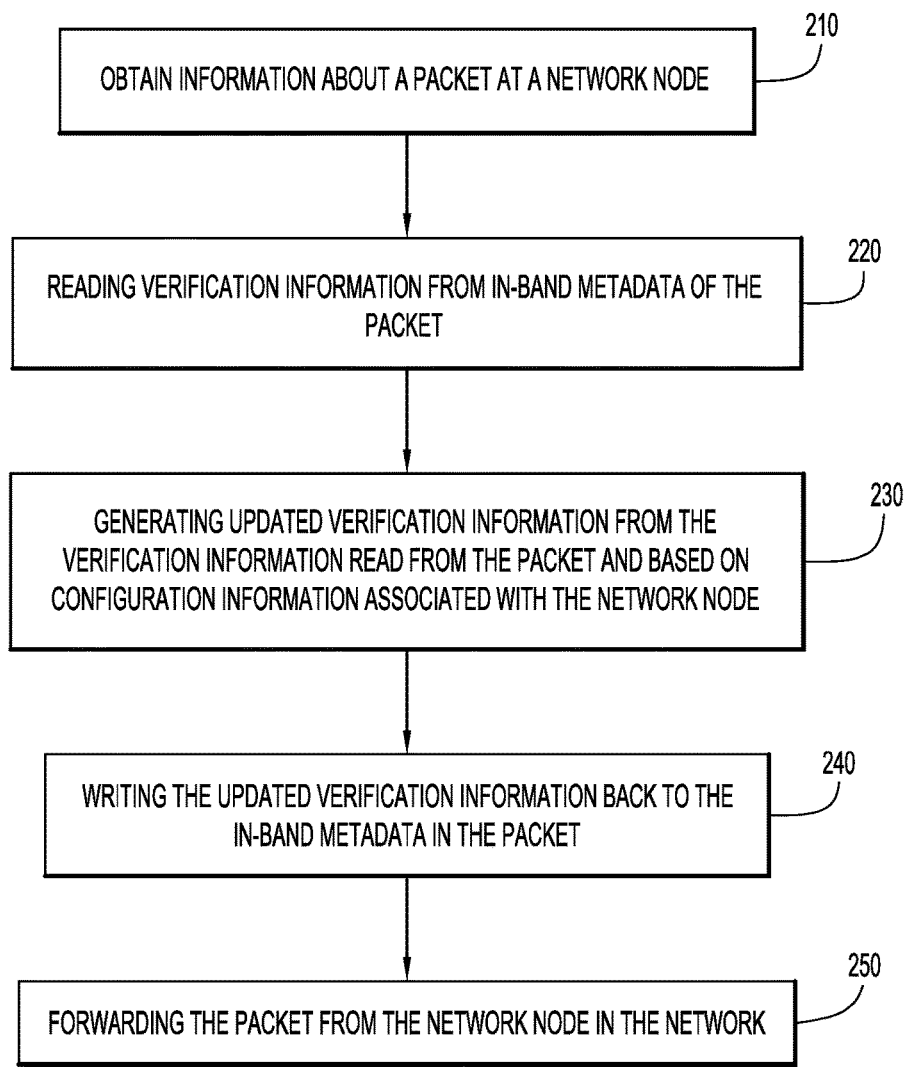
FIG. 2 is a high-level flow chart of operations performed at a network node as part of the path proof of transit verification techniques presented herein, in accordance with an example embodiment.
Figure 4:
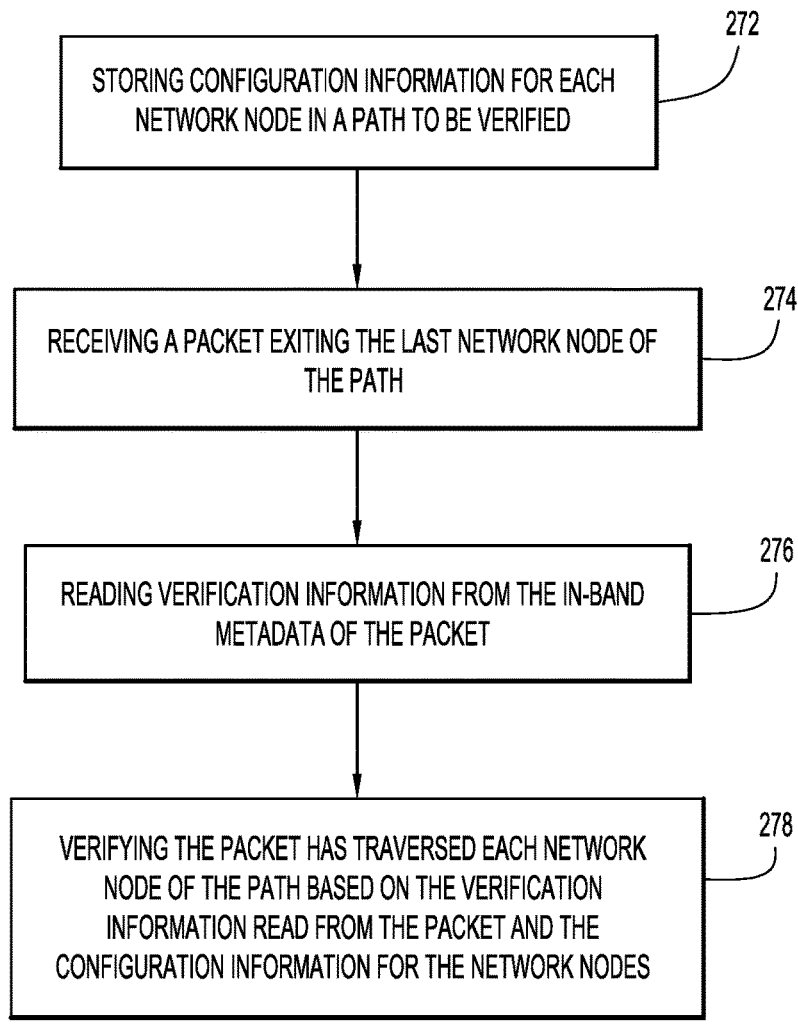
FIG. 4 is a flow chart depicting operations performed by an egress node as part of the path proof of transit verification techniques presented herein, in accordance with an example embodiment.

Turning now to FIG. 2, with continued reference to FIG. 1, a high-level flow chart is shown of a proof of transit method 200 by which a path of a packet through a plurality of network nodes in a network is verified. This method is performed by each network node, e.g., each of network nodes 130, 132 and 134 shown in FIG. 4 that is part of a particular path in a network through which it is to be verified that traffic has transited. At 210, a packet is received at a network node, or in the case of modern pipeline forwarding, information is obtained about a packet before the packet is fully received at the network node, wherein the information includes in-band metadata of the packet. In other words, it is not necessary that the network node has the entire packet in order to perform the subsequent verification related steps. Thus, whether for "store and forward" network node operations or modern pipeline forwarding, it suffices to say that at 210, information is obtained about a packet at a network node, the information including in-band metadata of the packet. At 220, the network node reads verification information from in-band metadata of the packet. At 230, the network node generates updated verification information from the verification information read from the packet and based on configuration information associated with the network node. At 240, the network node writes the updated verification information back to the in-band metadata in the packet. At 250, the network node forwards the packet in the network, e.g., to the next network node in the plurality of network nodes for the path to be verified.

Again, operations 210-240 are performed by each network node that is part of a path in a network through which it is to be verified that traffic passes. Still referring to FIG. 1, the egress node 140 may serve as a verifier node. The egress node 140 receives configuration information for the plurality of network nodes (e.g., network nodes 130, 132 and 134). After a packet has passed through network node 134, it eventually reaches the egress node 140. The egress node 140 receives the packet and reads the updated verification information stored as in-band metadata from the packet. The egress node 140 then verifies the path taken by the packet in the network based on the updated verification information read form the packet and the configuration information for the plurality of network nodes.

Numerous additional and more specific embodiments are presented hereinafter in which examples are explained for the verification information and for the configuration information. In one example, the verification information is cumulatively updated as the packet progresses through the plurality of nodes. The in-band metadata may include a first number to uniquely identify the packet and a second number cumulatively generated by the plurality of network nodes. The updated verification information may be generated by encrypting the third number using the cryptographic key to generate an encryption result, and combining the encryption result with a cumulative encryption result already stored in the in-band metadata.

Furthermore, in one example, the configuration information for each network node includes a secret. The secret of each network node may be created and distributed according to Shamir's Secret Sharing Scheme and the verifier node is configured to use the in-band metadata to validate that the packet passed through each respect network node according to Shamir's Secret Sharing Scheme. In another example, the secret is a unique cryptographic key and the in-band metadata includes a cumulatively generated encryption result. The egress (verifier) node 140 is configured to use the in-band metadata to verify that the packet passed through the path in the network.

Figure 3:
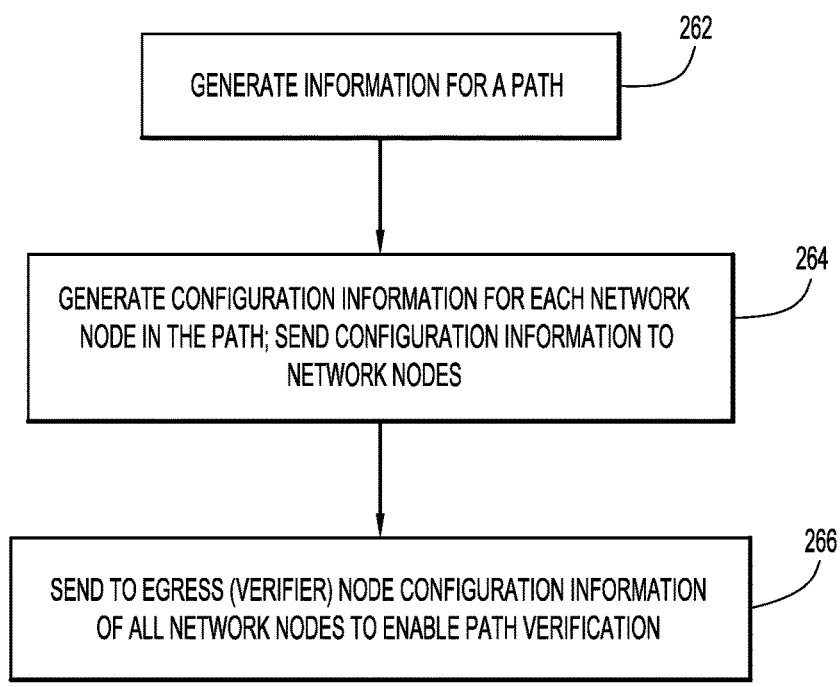
FIG. 3 is a flow chart depicting operations performed by a controller as part of the path proof of transit verification techniques presented herein, in accordance with an example embodiment.

The controller shown 102 shown in FIG. 1 may be a software-defined networking (SDN) controller configured to generate the configuration information for each of the plurality of network nodes and to send the configuration information to respective ones of the plurality of network nodes, and to the egress (verifier) node 140. FIG. 3 illustrates a flow chart for a method 260 performed by the controller 102. At 262, the controller generates information for a path in the network to be verified, that is, for which proof of transit is desired. This information may identify the network nodes that traffic must pass through to verify that the traffic traveled a particular path in the network. At 264, the controller generates configuration information for each network node in the path, and sends the configuration information to each respective network node. This enables each network node to perform a verification operation using the configuration information to generate updated verification information from verification information read from in-band metadata of a received packet, and to write back to the packet the updated verification information. Examples of the configuration information are described below. At 266, the controller sends to the egress (verifier) node the configuration information of all of the network nodes of the path to enable the egress node to perform path verification, as described in more detail hereinafter.

FIG. 3 illustrates a flow chart for a method 270 performed by the egress node 140. At 272, the egress node stores configuration information (received from the controller 102) for each network node in a path to be verified. At 274, the egress node receives a packet exiting the last network node of the path. At 276, the egress node reads the verification information from the in-band metadata of the packet. At 278, the egress node verifies that the packet has traversed each network node of the path based on the verification information read from the packet and the configuration for the network nodes (received from the controller 102). In other words, the egress node can evaluate metadata of the packet, together with other known information, to establish whether there is proof that the packet has transited the desired network path.

Examples of proof of transit for verifying that traffic passes through a path in a network are numerous. One example, described in further detail below, involves verifying that a packet passes through a path of a plurality of service functions of a service function chain. Another example is to verify that a packet passes through a Traffic Engineering (TE) route in a network.

As described below in further detail, the in-band metadata of a packet that is read from and written to by network nodes may be an extension header of the packet. The ingress node 120 may also play a role in generating or setting certain values store in the in-band metadata of a packet before it is directed into the network where it may eventually pass through the plurality of network nodes of a particular path in the network.

In summary, in accordance with one embodiment, a method is provided comprising: obtaining information about a packet at a network node in a network, the information including in-band metadata of the packet; reading verification information from in-band metadata of the packet; generating updated verification information from the verification information read from the packet and based on configuration information associated with the network node; writing the updated verification information back to the in-band metadata in the packet; and forwarding the packet from the network node in the network. The obtaining, reading, generating, writing and forwarding are performed at each of a plurality of network nodes in the network. The method may further include verifying path proof of transit of the packet in the network based on updated verification information read from the packet and the configuration information for each of the plurality of network nodes.

Similarly, a system is provided comprising: a plurality of network nodes in a network, each network node configured to: obtain information about a packet, the information including in-band metadata of the packet; read verification information from in-band metadata of the packet; generate updated verification information from the verification information read from the packet and based on configuration information associated with the network node; write the updated verification information back to the in-band metadata of the packet; and forward the packet into the network.

Cumulative Schemes for Network Path Proof of Transit

Encryption Scheme

In some embodiments, each network node may have a cryptographic key and may be configured to use this cryptographic key to generate a unique value for a specific packet. For example, each network node may use its cryptographic key to operate on the identifying value, such as, but not limited to, to generate an encryption or a hash of the identifying value. The generated encryption or hash and the identifying value may become the service verification information. Example cryptographic operations may include, but not limited to, block cipher encryption (e.g., the Advanced Encryption Standard (AES)), keyed-hash message authentication code (HMAC), etc. In some embodiments, because the cryptographic operations may be computationally intensive, the hardware at the network node may have hardware support for the cryptographic operations.

In some embodiments that rely on cryptographic operations, the piece of verification information may be generated cumulatively. That is, the first node in path may generate an initial version of the piece of verification information, and each subsequent node in the path may operate on the existing piece of information to leave their proof of transit on the piece of information.

In one embodiment, for example, the commutative property of the Exclusive Or (XOR) operation, similar to AES in Counter (CTR) mode, may be used. In this embodiment, each of the services may have their own cryptographic keys k1, k2, k3 . . . kn and the egress node (e.g., a verifier) may know all of these cryptographic keys. For example, a controller (e.g., the controller 102 shown in FIG. 1) may generate the cryptographic keys and distribute one cryptographic key to each network node and the egress node may obtain all cryptographic keys from the controller 102 through a secure channel. Each packet may be inserted with a metadata field that includes a RND field, a SEQ field, and a VERIFY field. The RND field may contain a random number generated at the ingress node. The SEQ field may contain a number and/or a timestamp generated at the ingress node. The SEQ field is useful to prevent a replay attack. The VERIFY field may be initialized to 0 at the ingress node. Each time a packet passes through the ingress node, the sequence number may be encrypted using the cryptographic key k1 of the ingress node to obtain a value represented by Enc(SEQ, k1), then the VERIFY field may be updated by VERIFY=Enc(SEQ,k1) XOR'ed with RND (as in AES-CTR mode).

When the packet passes through the second network node, the sequence number may be encrypted using the cryptographic key k2 of the second network node to obtain a value represented by Enc(SEQ, k2), then the VERIFY field may be revised by XORing the existing VERIFY value with Enc(SEQ, k2), such as VERIFY=VERIFY XOR Enc(SEQ, k2). This process may be performed at each network node by such cumulative XOR operation on the VERIFY field until the last network node in the path (e.g., nth node with n being an integer larger than one) with the sequence number encrypted using the cryptographic key kn, that is, VERIFY=VERIFY XOR Enc(SEQ, kn). Because the egress node is configured with information for all the cryptographic keys, the egress node may perform the path verification/validation by performing the same encryption operations that have been performed by each network node respectively, and apply a cumulative XOR with all encryption results on the VERIFY field, that is, VERIFY XOR Enc(SEQ, k1) XOR Enc(SEQ, k2) . . . XOR Enc (SEQ, kn). The path verification/validation at the egress node may result in RND only when all the network nodes give their respective encryption of the sequence number in the SEQ field. If the validation fails, the packet may be flagged (and redirected or dropped).

Although cryptographic operations, such as encryption or hash, may be computationally intensive, they are not order dependent, because the XOR operations may be applied in any order and still generate the same output. In addition, replay attacks may be prevented because the SEQ field value may be at least in part based on a timestamp such that replay attacks may be easily detected. Moreover, standard cryptographic operations may be used, such as, but not limited to, AES. Further, the per packet payload overhead is small. For example, the RND field and SEQ field may be 64 bits together and the VERIFY field may be 128 bits to conform to AES standard. Other bit length for RND, SEQ and VERIFY field, such as, 24 bits, 32 bits, 56 bits, 256 bits, may also be used but the overall overhead is still small. In some embodiments, the XOR based validation may be referred to as nested encryption.

FIG. 5 illustrates a high-level flowchart that summarizes an encryption scheme 280 for network path proof of transit, using the techniques described above. The operations shown in FIG. 5 are performed by each of the plurality of network nodes. At 282, a network node (among a plurality of network nodes of a path in a network), obtains information about a packet, the information (either fully received stored or pipeline forward processed). The information includes in-band metadata that includes one or more fields for at least a first value and a second value, the first value being based on a number and/or a timestamp generated at an initial network node of the plurality of network nodes of the path in the network, and the second value being cumulatively updated as the packet passes through the plurality of network nodes of the path in the network. At 283, the first value and the second value are read from the in-band metadata of the packet. At 284, an encryption result is generated based on the first value using a cryptographic key that is unique to each respective network node. At 285, an updated second value is generated based on the second value read from the packet and the encryption result. At 286, the updated second value is written to the in-band metadata of the packet. At 287, the packed is forwarded in the network.

Thus, in one form, a system is provided comprising: a plurality of network nodes associated with a path in a network, each network node configured to: obtain information about a packet, the information including in-band metadata that includes one or more fields for at least a first value and a second value, the first value being based on a number and/or a timestamp generated at an initial network node of the plurality of network nodes of the path in the network, and the second value being cumulatively updated as the packet passes through the plurality of network nodes of the path in the network; read the first value and the second value from the in-band metadata of the packet; generate, using a cryptographic key that is unique to each respective network node, an encryption result based on the first value; generate an updated second value based on the second value read from the packet and the encryption result; write the updated second value to the in-band metadata of the packet; and forward the packet in the network.

As explained above, the initial network node is configured to perform several operations, including: generating an initial encryption result using a cryptographic key of the initial network node and based on the number and/or the timestamp; generating an initial second value based on the initial encryption result; writing the initial second value to the packet; and forwarding the packet in the network.

An egress node is configured to receive and store cryptographic keys for the plurality of network nodes. When the egress node receives a packet (after the packet has presumably transited each of the plurality of network nodes), egress node reads the first value and the second value from the in-band metadata of the packet. The egress node computes encryption results for each of the plurality of network nodes using the cryptographic keys for each of the plurality of network nodes. The egress node computes an accumulated verification value based on the encryption results computed for each of the plurality of network nodes. The egress node then compares the second value read from the packet with the accumulated verification value such that when the second value read from the packet matches the accumulated verification value, the packet is determined to have passed through the plurality of network nodes of the path and otherwise the packet is determined not to have passed through the plurality of network nodes of the path.

Each network node may be configured to generate the updated second value using an Exclusive-OR operation of the second value read from the packet and the encryption result. Likewise, the egress node may be configured to compute the accumulated verification value using an Exclusive-OR operation of the encryption results computed for each of the plurality of network nodes.

Shared Secret Scheme

In another embodiment, a secret sharing method may be used such that each network node may have a piece of a secret and each network node uses its piece of the cryptographic secret to leave a signature as part of the verification information in the packet. For example, the Shamir's Secret Sharing Scheme (SSSS) may be used. In this embodiment, a single (complete) secret may be associated with a particular plurality or set of network nodes associated with a path for which it is to be verified that traffic has passed. Different shares or pieces of the single secret may be distributed from an SDN controller to the plurality of network nodes. Each network node may use their respective share to generate a piece/portion of verification information derived from packet specific information or to update a cumulative value in the metadata. An egress (verifier) node, which has access to the complete secret, may use the complete secret to verify the correctness of the received metadata.

In one embodiment implementing a secret sharing method, two polynomials POLY-1 and POLY-2 of the same degree may be used. The coefficients of POLY-1 and POLY-2 may be randomly selected integers between zero (inclusive) and a positive prime number P (exclusive), with the exception of the coefficient for the highest term being 1 to P-1. The first polynomial POLY-1 may be a secret and the coefficients are constant for all packets. The second polynomial POLY-2 may be public and its coefficients may be selected differently for different packets. That is, POLY-1 is secret and constant, and POLY-2 is public and unique per packet.

A point of a polynomial curve may be defined by a pair of numbers: an index and a value generated by the polynomial for that index. The points of POLY-1 may be distributed among services and kept secret. For each packet, a POLY-2 may be chosen at random. The corresponding points of POLY-2 may be calculated by each network node and added to its respective cryptographic secret of POLY-1. The summation result at each network node may be added to the packet in the metadata. An egress (verifier) node may attempt to construct a third polynomial POLY-3 from the points generated by all the network nodes and determine whether POLY-3=POLY-1+POLY-2. Unless there are a sufficient number of points of POLY-3, it cannot be constructed. Thus, this scheme may be used to ensure/verify that the packet travels through a desired path of network nodes per a policy. If the packet does not travel through the desired path of network nodes, then sufficient points of POLY-3 will not be generated in order for the verifier node to construct the curve. Therefore, it can be detected if a packet skips one or more network nodes in a path.

The security guarantees are based on the fact that at least two points are needed to define a straight line, 3 points to define a parabola, 4 points to define a cubic curve and so forth. That is, it takes k+1 points to define a polynomial of degree k with k being a positive integer. An attacker cannot learn the secrets, e.g., points of POLY-1, from the points of (POLY-1+POLY-2) as the operations are done in modulo P. This has been mathematically proven, for example, in Shamir's Secret Sharing Scheme proofs.

In one embodiment, a path to be verified may have k network nodes in it, and a polynomial of degree k+1 may be chosen. A random number RND-1 may be chosen per network node. For example, POLY-1 may be represented as POLY-1=RND-1+ax+bx$^2$+cx$^3$ . . . +nx$^{k+1}$, with RND-1, a, b, c, . . . n as the coefficients. Using Shamir's Secret Sharing Scheme (SSSS) algorithm, a threshold k+1 shares may be generated. One (share-index, share) pair may be generated for each network node and a separate (share-index, share) pair may be generated for the egress node (e.g., the verifier network node). These (share-index, share) pairs may be the points of POLY-1 and kept secret such that each network node only knows its own (share-index, share) pair. The egress node may be provided with (via the controller 102) the whole secret (e.g., the POLY-1) in addition to its own (share-index, share) pair in order to perform the network path verification.

When a new packet needs to start its journey through a path of network nodes, a new random number (RND-2) may be created and inserted into metadata at the source (e.g., the ingress node). Therefore, the RND-2 value may change per packet. Assume POLY-2 may be represented as POLY-2=RND-2+$a_1$x+$b_1$x$^2$+$c_1$x$^3$ . . . +$n_1$x$^{k+1}$. The network nodes may be also configured with $a_1$, $b_1$, $c_1$ . . . $n_1$ coefficients of POLY-2. Each time a packet arrives at a network node, the network node may calculate its respective share of RND-2 using the RND-2 stored in the metadata of the packet, its share-index and provisioned coefficients of POLY-2. Each network node adds its respective shares of RND-1 and RND-2 to get a share of a random number RND-3, which may be the coefficient for the term of zero degree of the polynomial POLY-3. This process may be simply adding a point on POLY-1 to another point on POLY-2 to get a point on POLY-3. The share of RND-3 obtained at each service may be put in the packet metadata and transmitted with the packet to the next network node in the path.

After traversing the network nodes of a path, the packet arrives at the egress node and the egress node may thus obtain all shares of RND-3 generated from the metadata by all the network nodes of the path. Note that k services contribute to k points of POLY-3 which is not a sufficient number of points to construct POLY-3. Therefore, the egress node may also generate another point for POLY-2 using its (share-index, share) pair for POLY-2 and add that point with its own corresponding point of POLY-1 (e.g., its own (share-index, share) pair). The egress node may thus combine all these shares of RND-3 to determine the value of RND-3. At the same time, the egress node also knows RND-1 (e.g., it knows the whole secret of POLY-1) and RND-2 (e.g., from the packet metadata) and thus, the egress node may obtain proof of transit according to whether the determined value of RND-3 is indeed the expected value, that is, RND-3=RND-2+RND-1.

In one embodiment, an optimization may be performed, in which instead of each network node putting its share of RND-3 in the metadata of the packet, each network node applies the SSSS combine algorithm on its share of RND-3 with a cumulative share value of RND-3 contained in the metadata to generate an updated cumulative share value, and only put the cumulative share value in the metadata.

One example flow of using the secret sharing method may start with a set up process. At the start of the set up process, a prime number P may be chosen such that all subsequent operations may be done in modulo P. Afterwards, a secret may be chosen, for example, the random number "RND-1" may be generated, for example, by an SDN controller. Only the egress node may know the random number. Then, the secret may be split using Shamir's Secret Sharing Scheme. All the network nodes along the path to be verified may be configured with their respective unique shares of the secret, which may be represented as (i, share-i) where i is the index of the share. In some embodiments, a Lagrange basis polynomial's zero degree term may be calculated as a constant corresponding to its index. This constant may be referred to as Lagrange polynomial constant (LPC). At a final step of the set up process, the coefficients $a_1$, $b_1$, $c_1$ . . . $n_1$ of POLY-2 may be chosen and all the network nodes may be configured with this set of coefficients, with only RND-2 being different for each packet and assigned to the packet later. In one embodiment, to optimize per packet secret splitting of RND-2, these coefficients and the index may be used during the set up process to calculate part of polynomial evaluation of RND-2 at index i, which may be referred to as share2-i-interim.

When a packet enters a network path, that is, the packet passes the ingress node, a number RND-2 may be chosen. The number RND-2 may be random but it need not be random. For example, the number RND-2 may be a timestamp, a sequence number, a hash of some fields in the packet, or a combination of any or all of these. Once the number RND-2 is chosen, it may be added to the metadata field of the packet such that all network nodes in the path may access the number RND-2. Thus, the number RND-2 is per packet and shared by all services. In the embodiments that implement a cumulative share value, a field in the metadata may be initialized, for example, by storing an initial cumulative share value of zero ("0").

When the packet visits each network node including the egress node, a share of RND-2 may be calculated for the respective Service-i. That is, a point in the POLY-2 may be calculated. In embodiments that implement the optimization share2-i-interim, this share2-i-interim has already been calculated during set up process and the share of RND-2 may be obtained by simply adding the share2-i-interim to RND-2. The share of RND-2 may be added with a respective share of RND-1 (share-i) at the service to obtain a new combined share of RND-3. The cumulative share value may be retrieved from the metadata and updated such that Cumulative=Cumulative+RND-3*LPC, in which the "Cumulative" is the cumulative share value, RND-3 is the share of RND-3 at the respective service and LPC is the Lagrange basis polynomial's zero degree term for the respective service. The updated cumulative share value may be put back in the metadata of the packet to be transmitted to the next network node in the path.

If the next network node is the egress node, the updated cumulative share value may be compared to RND-1+RND-2. When the updated cumulative share value matches RND-1+RND-2, it indicates that the packet has indeed passed through all network nodes in the path and may be forwarded on in the network. When the updated cumulative share value does not match RND-1+RND-2, however, it indicates that the packet has not passed through all network nodes in the path and the packet may be flagged and processed accordingly, for example, dropped.

An example flow is described below for verifying a path with two network nodes: Network Node-1 and Network Node-2. In this example, the number 53 may be selected as the prime number P and the number 10 may be selected as the secret RND-1. The polynomial POLY-1 may be $10+3x+3x^2$, and the shares in the (index, share value) pair format may be generated as (1, 16), (2, 28), (3,46), (4,17), (5,47) etc. Each network node and the egress node may be assigned a respective index and share value, for example, Network Node-1 is assigned (2,28), Network Node-2 is assigned (4,17), and the egress node is assigned (5,47). The Lagrange basis polynomials may be obtained as:

$$\frac{(x-4)(x-5)}{(2-4)(2-5)} = \frac{1}{6}x^2 - \frac{3}{2}x + \frac{10}{3}$$

$$\frac{(x-2)(x-5)}{(4-2)(4-5)} = -\frac{1}{2}x^2 + \frac{7}{2}x - 5$$

$$\frac{(x-2)(x-4)}{(5-2)(5-4)} = \frac{1}{3}x^2 - 2x + \frac{8}{3}$$

According to the Lagrange basis polynomials, the Lagrange basis polynomial constant (LPC) for Network Node-1, Network Node-2 and egress node are 10/3, −5 and 8/3 respectively, and thus:

LPC(Network Node-1)=(10/3)mod 53=21

LPC(Network Node-2)=(−5)mod 53=48

LPC(Egress Node)=(8/3)mod 53=38

Suppose the second polynomial POLY-2 is $RND-2+7x+10x^2$ and the number 45 may be chosen as RND-2 for a packet. POLY-2 for this packet may be $45+7x+10x^2$ and the shares in the (index, share value) pair format may be (1,9), (2,46), (3,50), (4,21), (5,12) etc. When the packet enters the path, the ingress node may store the RND-2=45 and a cumulative share value CUM=0 as the metadata for the packet and forward the packet with the metadata to the first network node, Network Node-1. At Network Node-1, the respective share of POLY-2 may be obtained as 46 because the share index of Service-2 is 2. The cumulative share value CUM may be updated according to CUM=CUM+(((Share(RND-1)+Share(RND-2))*LPC)mod P, which may be CUM=0+((28+46)*21)mod 53=17. At Network Node-2, the respective share of POLY-2 may be obtained as 21 because the share index of Network Node-2 is 4. The cumulative share value CUM may be updated according to CUM=CUM+(((Share(RND-1)+Share(RND-2))*LPC)mod P, which may be CUM=17+((17+21)*48)mod 53=17+22=39. At the egress node, the respective share of POLY-2 may be obtained as 12 because the share index of the egress node is 5. The cumulative share value CUM may be updated according to CUM=CUM+(((Share(RND-1)+Share(RND-2))*LPC)mod P, which may be CUM=39+((47+12)*38)mod 53=39+16=55 mod 53=2. The egress node may also compute (RND-1+RND-2)mod 53, which is (10+45)mod 53=2. Therefore, the cumulative share value calculated by the egress node matches the RND-3 obtained by adding RND-1 and RND-2 and thus, the egress node may successfully verify that the packet indeed passes through Network Node-1 and Network Node-2.

Embodiments according to the present disclosure may be used to prevent misconfigurations or tricks with routing that may be played—in which traffic may be made to bypass the certain network nodes, such as a firewall, load-balancer, content optimizer, etc. An additional aspect involves proving that a packet for a certain application goes through a specific path in a network. Without directly verifying that a packet passes through certain network nodes, conventional techniques rely on constantly validating the physical layout of the network and all the associated device configurations. In contrast, as long as the points of POLY-1 are kept secret, in an embodiment, an attacker attempting to bypass a few network nodes will miss adding respective point on POLY-1 to corresponding point on POLY-2, thus the egress node cannot construct POLY-3 for cross verification. Moreover, an attacker observing a value of CUM as the packets enter and leave, cannot construct a point on POLY-1. Differential analysis of CUM before and CUM after cannot be done because the operations are done in modulo prime number P and many possibilities of the point may exist. In addition, the threat of differential analysis across packets may be mitigated due to the random number RND-2 for POLY-2.

It should be noted that in practice the polynomial may be of degree(s) greater than the maximum number of network nodes. Also, the RND-2 value may be EPOCH+Random Number (concatenation of bits). In some embodiments, a pure sequence number may be avoided because it may be predictable. Moreover, the prime number may be greater than RND-2 but not very large. In addition, all operations may be done in modular arithmetic, so division may be inverse in modulo and not regular division. Further, embodiments may involve POLY-1 and POLY-2 not being the same.

Figure 6:
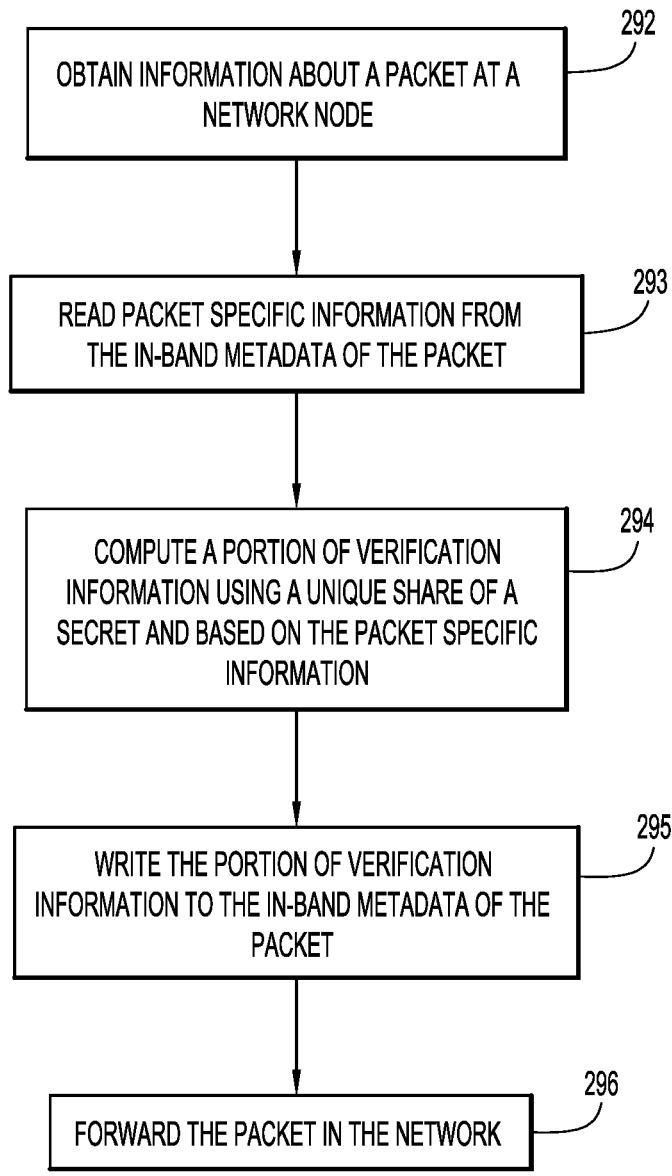
FIG. 6 is a flow chart depicting operations performed at a network node for generating verification information using secret sharing techniques according to another example embodiment.

Referring now to FIG. 6, a high-level flowchart is shown that depicts operations of a method 290 performed at each of a plurality of network nodes in accordance with the secret sharing techniques described above. A secret is associated with a path defined by the plurality of network nodes. At 292, information about a packet at a network node is obtained, the information including packet specific information in in-band metadata. At 293, the packet specific information is read from the in-band metadata. At 294, a portion of verification information is computed using a unique share of the secret and based on the packet specific information. At 295, the portion of verification information is written to the in-band metadata of the packet. At 296, the packet is forwarded in the network.

When the packet reaches an egress node that has access (e.g., has already been configured with) the secret, the egress node reads the portions of the verification information, written by the plurality of network nodes, from the in-band metadata of the packet. The egress node then verifies that the packet passed through (i.e., transited) the plurality of network nodes of the path using the secret and the portions of verification information read from the in-band metadata of the packet.

Thus, a system is provided comprising: a plurality of network nodes associated with a path in a network and for which path a secret is associated, each network node configured to: obtain information about a packet, the information including packet specific information in in-band metadata of the packet; read the packet specific information from the in-band metadata; compute a portion of verification information using a unique share of the secret and based on the packet specific information; write the portion of verification information to the in-band metadata of the packet; and forward the packet in the network.

As described above, the unique shares of the secret may be distributed in accordance with a secret sharing scheme. Moreover, each unique share of the secret may comprise one or more points of a first polynomial. In this case, each network node of the plurality of network nodes is configured to compute the portion of verification information by: computing points of a second polynomial based on the packet specific information; adding the points of the second polynomial to the points of the first polynomial to produce a summation result; and writing the summation result to the in-band metadata of the packet. The egress node is configured to verify that the packet passed through the plurality of network nodes by attempting to construct a third polynomial from the summation results generated by the plurality of network nodes such that if a sufficient number of points of the third polynomial can be generated the packet is determined to have passed through the plurality of network nodes and otherwise the packet is determined to not have passed through the plurality of network nodes.

Moreover, for k plurality of network nodes, the first polynomial may have degree k+1 and is of a form RND-$1+ax+bx^2+cx^3 \ldots +nx^{k+1}$ with RND-1 being a random number and a, b, c . . . n being other coefficients of the first polynomial, and the unique share of the secret may comprise a (share-index, share) pair corresponding to points of the first polynomial and the verifier node being provided with a unique (share-index, share) pair as well as an entirety of the first polynomial. Each network node may be provided with coefficients $a_1, b_1, c_1 \ldots n_1$ of a second polynomial RND-$2+a_1x+b_1x^2+c_1x^3 \ldots +n_1x^{k+1}$, and wherein each network node is configured to compute the portion of verification information by: computing a share of RND-2 based on RND-2 read from the in-band metadata of the packet and the coefficients of the second polynomial; and adding the share of RND-2 to RND-1 to produce a share of RND-3 for the third polynomial. Each network node generates an updated cumulative share value of RND-3 from a cumulative share value of RND-3 read from the in-band metadata of the packet, and writes the updated cumulative share value of RND-3 to the in-band metadata of the packet. The egress node may be configured to verify by: reading from the packet all shares of RND-3 and all shares of RND-2 generated by the plurality of network nodes; combining all shares of RND-3 generated by the plurality of network nodes to produce a sum value of RND-3; computing a share of RND-2 of the second polynomial and adding that share all shares of RND-2 generated by the plurality of network nodes to produce a sum value of RND-2; determining whether the sum value of RND-3 is equal to the sum value of RND-2 plus a value for RND-1 that is known at the egress node.

Secret Size

The size of the data used in the schemes presented above depends on the amount of metadata a particular protocol embodiment or deployment can carry. For example, there may be situations where only 32 bits can be carried by the protocol for either scheme presented above. As one example, with AES, the cryptographic key may be 128 bits and with SSSS, the secret (RND-1) and RND-2 may be 64 bits. The cumulative value referred to above may also be 64 bits. For the encryption scheme described above, the output of AES may be 128 bits, so the cumulative value may be truncated to 64 bits if needed. Verification may also involve re-encrypting the RND-2 value and truncate consistently to avoid failure.

Secret Renewal/Refresh

Secret recycling is important to the overall security of the schemes. It helps mitigate replay attacks. If the secrets are not recycled an adversary/attacker could reuse cumulative values from older packets into newer packets and bypass the certain network nodes of choice.

Also recycling is based on the RND-2 size. If an encryption approach is used, recycling does not depend on cryptographic key size but it is still useful to recycle the keys because it is possible to run out of entropy in RND-2 values For example, a 64 bit RND-2 value will support $2^{64}$ packets, which corresponds to approximately $2 \times 10^{30}$ Giga-Bytes. On a 1 GBps line, this would take 24 days.

In situations where more than 32 bits for RND-2 can be used, the network nodes can be preconfigured with more than one RND-1. With additional storage space requirement on each network node and indexing each of these RND-1 requests, the recycle requests could be further pushed. A deterministic function of RND-2 could be used in order to determine the index to RND-1. For example, the last byte of RND-2 could be converted to a number and used to determine which RND-1 share to be used for a given packet.

Secret Creation and Distribution

The controller, e.g., a server, creates secrets on an ongoing basis and distributes the secrets on an ongoing basis. This would be part of the operations performed at step 264 as shown in FIG. 3, for example, and at step 434 of FIG. 10, described below. For example, when the system runs out of random values (for the first polynomial) a new first polynomial has to be created and the shares have to be distributed. Similarly, in the encryption scheme, the cryptographic keys can become exhausted. Various distribution modes are possible. In a first mode, also known as a "push mode" the controller distributes keys at regular (e.g., periodic) intervals. In a second mode, also known as a "pull mode" the controller distributes keys in response to a request from a network node. For example, an encapsulating node determines that it has exhausted random numbers and sends a request to the controller for a renewal/refresh. A mixed mode is also possible. For example, an encapsulating node "pulls" a new secret-share, and that triggers the controller to "push" a secret-share to all other nodes in the path.

Thus, in accordance with an embodiment, a method is provided comprising: A method comprising: generating a secret that is associated with a path through a plurality of network nodes in a network for which it is to be verified that traffic has transited; and distributing the secret to respective ones of the plurality of network nodes, to enable each network node to generate verification information for a packet, based on in-band metadata carried by the packet, as the packet travels the path in the network. In one form, the generating may involve generating a new secret for each of the plurality of network nodes, and the distributing may involve distributing the new secret to respective ones of the plurality of network nodes in response to a request from one of the plurality of network nodes. In another form, the generating may involve generating a new secret for each of the plurality of network nodes on a regular basis, and the distributing may involve distributing the new secret to respective ones of the plurality of network nodes on a regular basis. In one form, the secret may be based on random values associated with a polynomial, the generating may involve generating a new polynomial when random values for the polynomial are exhausted, and the distributing may involve distributing unique shares of random values associated with the new polynomial to respective ones of the plurality of network nodes. In another form, a new secret is generated for each of the plurality of network nodes in response to a request received from one of the plurality of network nodes, and the distributing involves distributing unique shares of the new secret to respective ones of the plurality of network nodes. The secret may be a unique cryptographic key for each of the plurality of network nodes to cumulatively generate the verification information. In this case, new unique cryptographic keys for the plurality of network nodes when the unique cryptographic keys are exhausted.

Proof of Transit: Service Chain Verification—One Example of a Network Path Verification Reference is now made back to FIG. 1. A service chain (also known as service function chain (SFC) comprises a plurality of service functions through which packets are to be directed for various functions to be applied to the packets. The service chain may comprise an entry point node (also called a head-end node, ingress interface or ingress node) and an ordered list of service functions and their physical network location, represented as [service-function, service-location] tuples. The service functions or services may be executed on packets that are forwarded through the chain of service locations. The service locations may also be called network nodes or service nodes. In some embodiments, the service locations may be Service Function Forwarders (SFFs) as defined in Internet Engineering Task Force (IETF) Request for Comments (RFC) 7665.

Individual service functions referenced by the service chain may be deployed at multiple points in a network topology dependent upon redundancy and horizontal service scaling requirements. A globally unique service-chain-id may be used to uniquely identify a service chain and a series of service functions of the service chain. A network node (or service node) may be a network device, such as a router, switch, gateway, etc., and a network node may be physical network element or a virtual network element. The network node (or service node) may have computing resources (e.g., a server blade or other computing device) that are configured with applicable software capability to execute one or more services on network traffic that is directed to that network node.

The service functions in a service chain may include any type of services. Examples of services include services in any networking layers, for example, Layer2-switching, Layer3-routing, and all the way to Layer7-Firewall, Content Cache, Load Balancer, or other services on these layers. In one embodiment, for example, service function chain (SFC) validation may be used to validate whether a packet takes a route it is supposed to take regardless of the types of the services along the service chain.

A packet may be forwarded through a service chain. The head-end node (or ingress node) may act as a packet classifier interface into the service chain (determining which traffic flows require redirection into the service chain and which do not) imposing the necessary service header (containing the service-chain-id) and the transport encapsulation to direct the traffic flow to the first service function at the appropriate network location as specified in the service chain structure.

A service chain may be identified by a service chain identifier (e.g., service-chain-id) as follows.

Service-chain-id$^x$=[ingress node], [service-function$^1$, service-location$^{22}$],[service-function$^2$, service-location$^2$], [service-function$^3$, service-location$^{57}$], [egress node].

The structure of the service chain forces traffic that is classified at the ingress node as belonging to the service chain to be forwarded into the service chain before being sent off network.

In one embodiment, at an orchestration layer in a cloud management platform, a service policy may be defined for specific a task, (for example secure web hosting). The service policy may require (in addition to many other elements) specific L4-L7 service functions, service metrics and associated selection/attachment criteria (i.e. tenant, class of traffic, flow, etc.). These services and associated metrics are sent to the controller 102 (FIG. 1) for service selection, graph creation and rendering.

Active service functions in the network may be registered with the controller 102. Registration may involve the controller 102 receiving notifications of all active service functions among the plurality of network nodes, each notification including information describing service function capabilities. Post-service function registration, the controller 102 may have a view of all available service functions within the service domain and their locations, e.g. network location, Internet Protocol/Media Access Control (IP/MAC) addresses, as well as, if needed, topological placement e.g. [data center1, rack1]. Additionally, network nodes may publish their service function capabilities, e.g. [service-function$^1$ is an application firewall, and can process 500 sessions], [service-function$^2$ is an IP firewall, and can handle 200,000 sessions] and so on. The controller 102 maintains a catalog of services, and the associated service functions that comprise them (a service may consist of a single or multiple service functions), that can be instantiated as needed, with similar attributes. This catalog of services comprises data describing attributes of all active service functions, and from this data the controller 102 generates information for a service chain by selecting necessary service functions and their associated network nodes for the service chain from the stored data. The controller 102 also identifies which one or more service functions in the service chain are stateful. For example, the controller 102 may store information indicating that it has an image for a server load balancer, that this type of load balancer requires y amount of central processor units (CPU) and memory to run, and is capable of Secure Socket Layer (SSL) offload at the rate of n packets per second.

During service chain creation, the controller 102 selects all the necessary service functions and their locations, and a service path graph is created. The service path graph may be, for example, a rendered service path according to RFC 7665. At this point, the service infrastructure has, in addition to a view of available service functions, a series of service paths, both forward and reverse (if required) coupled and the associated classification criteria (tenant, flow, etc.). The controller 102 generates the service header and generates classification criteria of the service chain, and as explained further hereinafter, sends the service header and the classification criteria for the service chain to the one or more network nodes.

Figure 7:
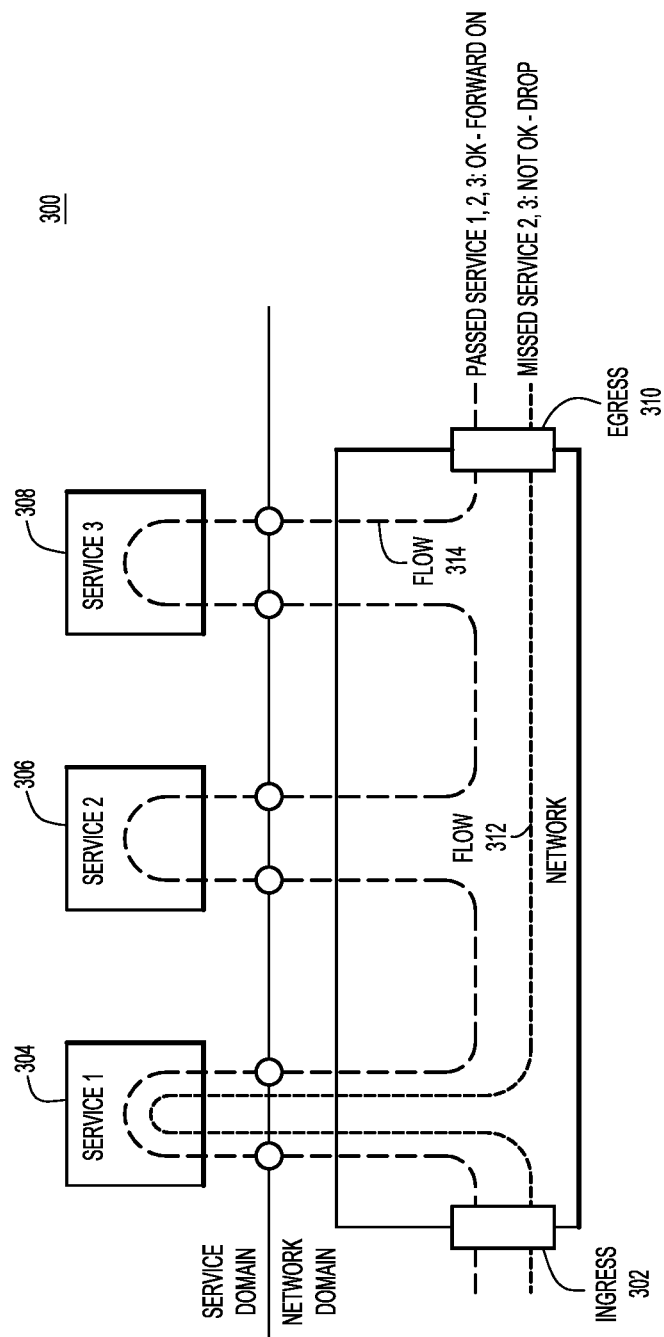
FIG. 7 is a diagram illustrating an example of traffic flows and use of the path proof of transit verification techniques in a service chain, in accordance with an example embodiment.

Reference is now made to FIG. 7, which illustrates examples of traffic flows through a service chain 300 in a network. The service chain 300 may comprise an ingress node 302, a service node for service 1 at reference numeral 304, a service node for service 2 at reference numeral 306, a service node for service 3 at reference numeral 308, and an egress node 310. Service 1, service 2 and service 3 may be in a service domain and the ingress node 302 and egress node 310 may be in a network domain. The ingress node 302 may receive packets and determine whether each packet should pass through the service chain 300. If a packet should traverse the services of the service chain 300, the ingress node 302 may mark that packet as belonging to the service chain and forward the packet to service 1, which may be configured as the first service in the service chain 300. Service 1 may perform the first service on the packet and forward the packet along. If the packet traverses each service in the service chain 300, for example, as indicated in the flow 314, the packet will pass through service 1, service 2 and service 3, and each service will operate on the packet according to their respective services. When the packet reaches the egress node 310, the egress node 310 may perform a service chain validation on the packet exiting the service chain and verify that the packet indeed has passed through all services defined in the service chain 300. If the packet indeed passes through all service in the service chain 300, the service chain validation process may return a success and the packet may be forwarded on, such as in the flow 314. If, however, when a packet reaches the egress node 310, the egress node 310 performs the service chain validation process on the packet but the service chain validation process fails, the packet may be flagged as failing the verification (proof of transit) and dropped, such as in the flow 312.

In various embodiments, service chain verification/proof of transit at the egress node may be performed, based at least in part, on metadata added to packets that traverse a service chain. A packet may be assigned an identifying value such as a timestamp (e.g., the time when it enters the service chain) or a random number, such that the packet may be uniquely identified among all packets passing through the service chain. When a packet passes through a service node in the service chain, the service node may perform, in addition to its service as specified in the service chain, an operation to generate or revise a piece of verification information. The generated or revised piece of verification information and the packet identifying value may be added to the packet as the metadata to serve as the service verification information. The egress node may have all secrets of all services in the service chain. When a packet reaches the egress node, the service verification information may be extracted from the packet and the egress node may use the packet identifying value and the secrets of all services to generate or revise a copy of the piece of verification information and compare its own version with the generated or revised piece of verification information extracted from the packet to verify that the packet indeed passes through all services in the service chain.

Figure 8:
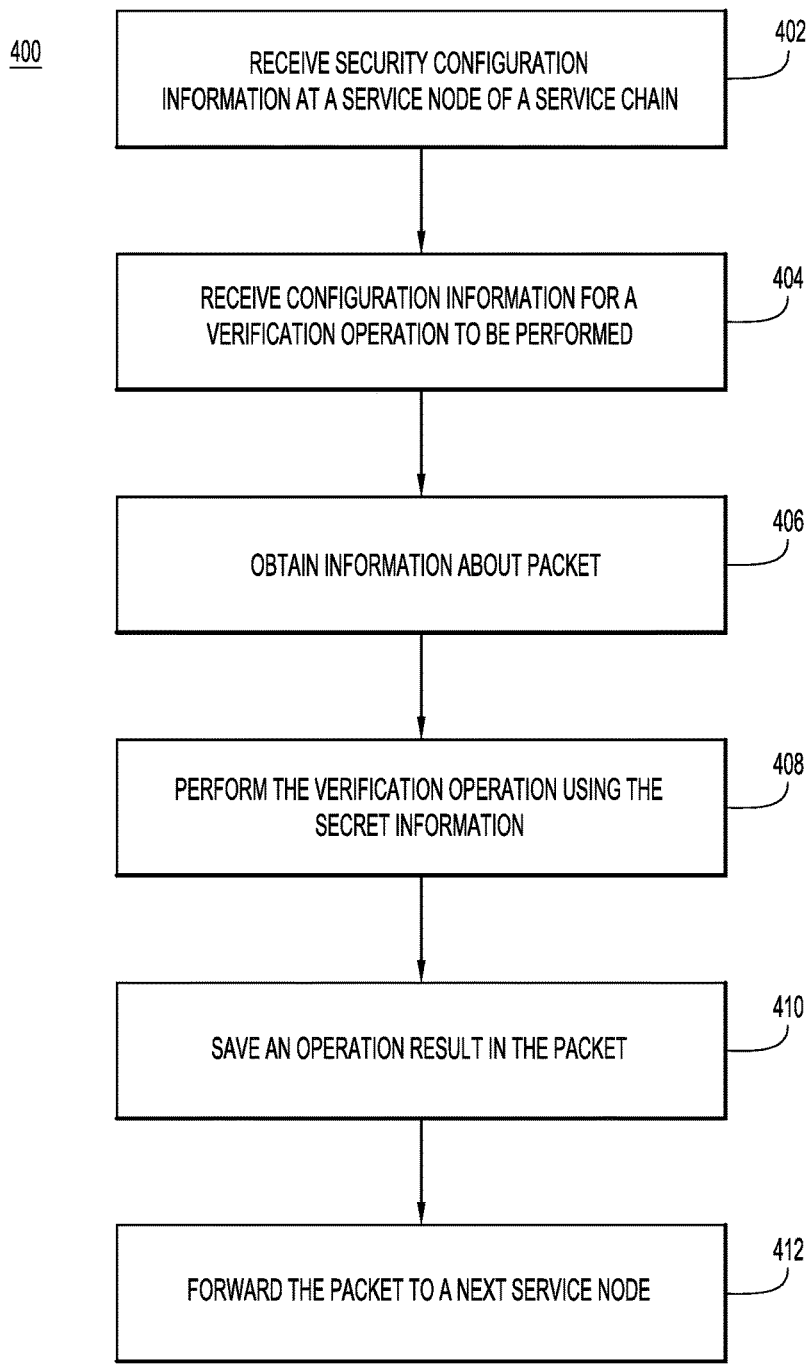
FIG. 8 illustrates a flow chart illustrating operations performed at a service function as part of the process depicted in FIG. 7, according to an example embodiment.

Referring to FIG. 8, an example of a flowchart is shown that generally depicts the operations of performed by a service function (e.g., at a service node) for facilitating service chain proof of transit according to the techniques described herein. Reference is also made to FIGS. 1 and 7 for the description of FIG. 8. At 402, security configuration information for a service function may be received at a service node of a service chain. For example, the service node for service 1 at reference numeral 204 may receive security configuration information for service 1. The security configuration information may be a share of a secret for an embodiment that implements a secret sharing method or a cryptographic key for an embodiment that implements cryptographic operation. At 404, configuration information for a verification operation to be performed at the service node may be received. The configuration information may indicate whether a share of POLY-3 may be calculated or a cryptographic operation using a cryptographic key may be performed at the service node. At 406, a packet traversing the service chain may be received, or more generally, to account for pipeline forwarding, information is obtained about a packet (which may occur before the entire packet reaches the service node). At 408, the verification operation may be performed using the secret information and information read from in-band metadata of the packet. At 410, an operation result may be written back to (saved) the in-band metadata in the packet. For example, a VERIFY value may be saved as part of the metadata for cryptographic operations and a cumulative secret share value may be saved as part of the metadata for a secret sharing method. At 412, the packet may be forwarded to a next service function in the service chain. The next service function may be a regular service function of the service chain or the next hop may be the egress node.

Figure 9:
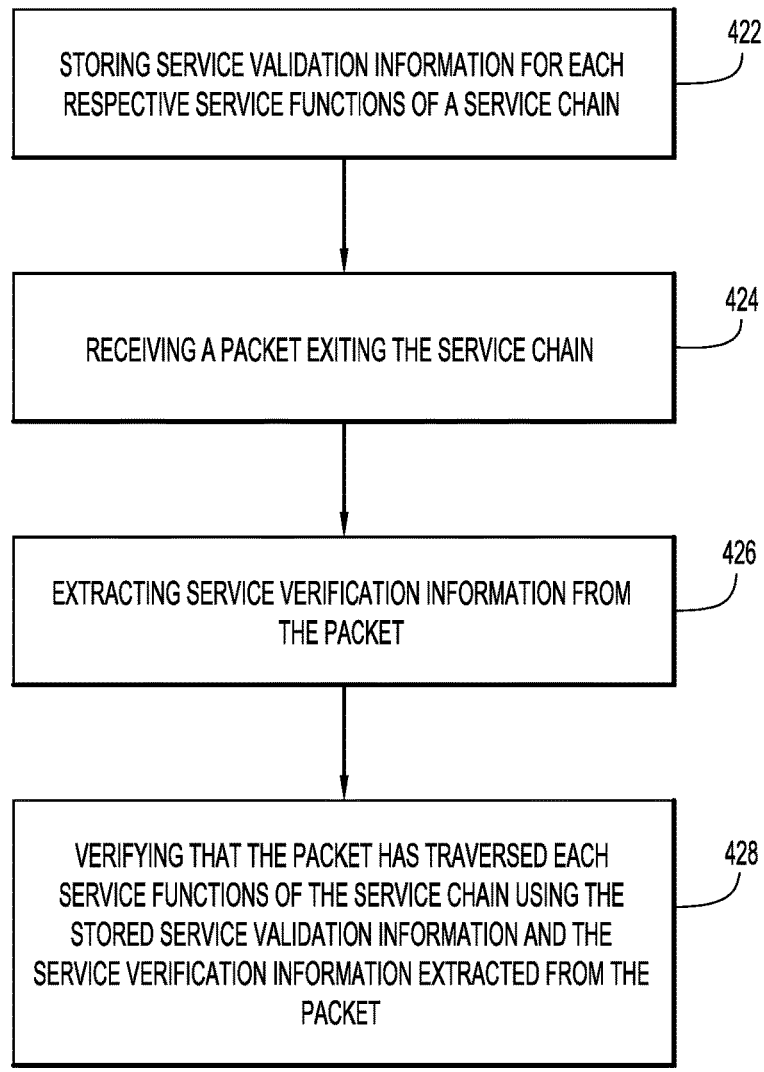
FIG. 9 illustrates a flow chart illustrating operations of an egress node in verifying proof of transit through all service functions of a service chain, according to an example embodiment.

Referring to FIG. 9, an example of a flowchart is shown that generally depicts a verification/proof of transit process 420 that an egress node may perform for facilitating service chain validation according to the techniques described herein. Reference is also made to FIG. 7 in connection with the description of FIG. 9. At 422, service validation (i.e. the aforementioned security configuration) information for each respective service functions of a service chain may be stored. As described above, in embodiments using a secret sharing technique, the egress node may store the secret (e.g., POLY-1 including RND-1 and other coefficients) and in embodiments using cryptographic keys, the egress node may store the cryptographic keys for all services of the service chain. At 424, a packet exiting the service chain may be received. As shown in FIG. 7, a packet needs to go through the egress node as the last stop before leaving the service chain. At 426, service verification information may be extracted from the packet. For example, RND-2 and cumulative share value may be extracted from the packet in embodiments using a secret sharing, and RND, SEQ and VERIFY may be extracted from the packet in embodiments using cryptographic operations based on cryptographic keys. At 428, it may be verified using the stored service validation (i.e., security configuration) information and the service verification information extracted from the packet that the packet has traversed each service function of the service chain. For example, in embodiments using a secret sharing, RND-3 may be obtained by shares of RND-1 and RND 2, and also verified using RND-1+RND-2; and in embodiments using cryptographic operations, the XOR operations may be applied on the VERIFY field with the encryption of SEQ using the respective cryptographic keys, and the XOR operations result may be verified with RND.

Figure 10:
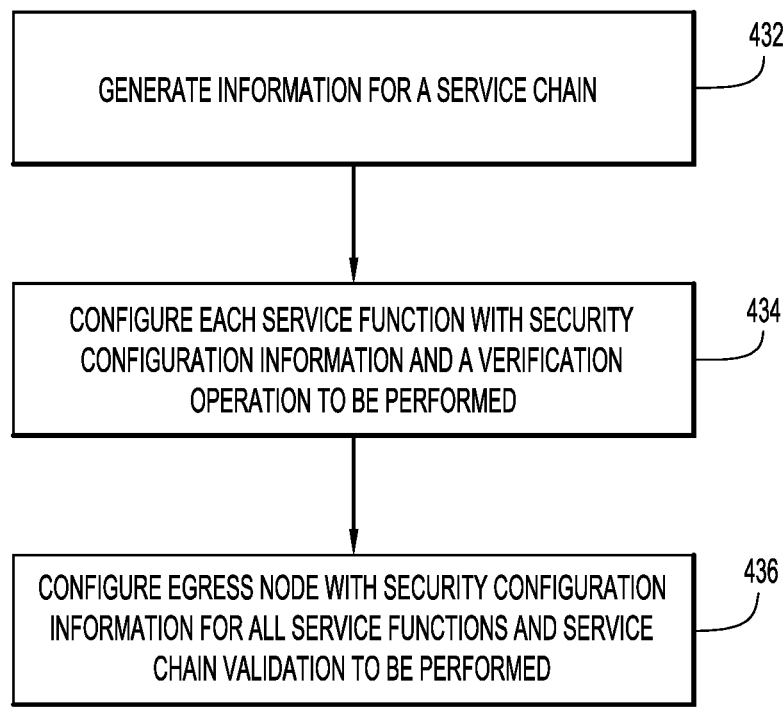
FIG. 10 illustrates a flow chart of a controller in configuring each service function of a service chain to participate in path proof of transit of a service chain, according to an example embodiment.

Referring to FIG. 10, an example of a flowchart is shown that generally depicts the operations a controller (e.g., controller 102 shown in FIG. 1) may perform for facilitating service chain proof of transit according to the techniques described herein. Reference is also made to FIGS. 1 and 7 for the description of FIG. 10. At 432, information for a service chain may be generated. For example, the controller 102 may identify the service functions at network nodes to be applied to packets for the service chain 300 and define the service chain to include those services. At 434, each service function may be configured with security configuration information and a verification operation to be performed at the service function. For example, in embodiments using secret sharing, the shares of POLY-1 may be generated by the controller and sent to the service functions, and each service function may be configured to compute shares of RND-3 using the their respective share of POLY-1. In embodiments using cryptographic operations, the controller may generate the cryptographic keys and distribute to the service functions. At 436, the egress node of the service chain may be configured with the security configuration information for all service functions and the service chain validation to be performed at the egress node. For example, depending whether an embodiment implements a secret sharing method or cryptographic operations, the controller may configure the egress node to perform the corresponding service chain validation.

Service chaining may use NSH techniques as well as traditional chaining approaches (e.g. interface or VLAN stitching; traffic steering through a series of NAT-devices such as firewalls). The path proof of transit techniques presented herein are applicable to any implementation of a service chain.

Other Uses of Network Path Verification

Other example uses of the path verification techniques presented herein include route validation for Traffic Engineering (TE) routes in a network, validate source routing schemes (e.g. through a combination of Segment Routing with an in-band Operation, Administration, and Maintenance (OAM) metadata header).

In general, these path verification techniques are useful for any policy-based routing (PBR) approach.

Transport Mechanisms for Carrying In-Band Metadata for Network Path Proof of Transit Embodiments according to the present disclosure may be implemented with different transport mechanisms for the in-band metadata. Regardless of whether a secret sharing method or cryptographic keys are used, metadata containing verification information may be added to each packet as it traverses a path in a network. The space available in a packet to carry the metadata may vary from deployment to deployment. In deployments in which network nodes perform a proxy-function for service nodes, the amount of metadata becomes important because the proxy node needs to buffer the header while the traffic is in transit to/from the service node. In various embodiments, the metadata may be carried as part of the packet header. For example, the metadata may be carried as part of Internet Protocol version 6 (IPv6) extension header or option header, or as a new NSH Metadata (MD) type 1 if the network service header is used for service chaining.

Figure 11:
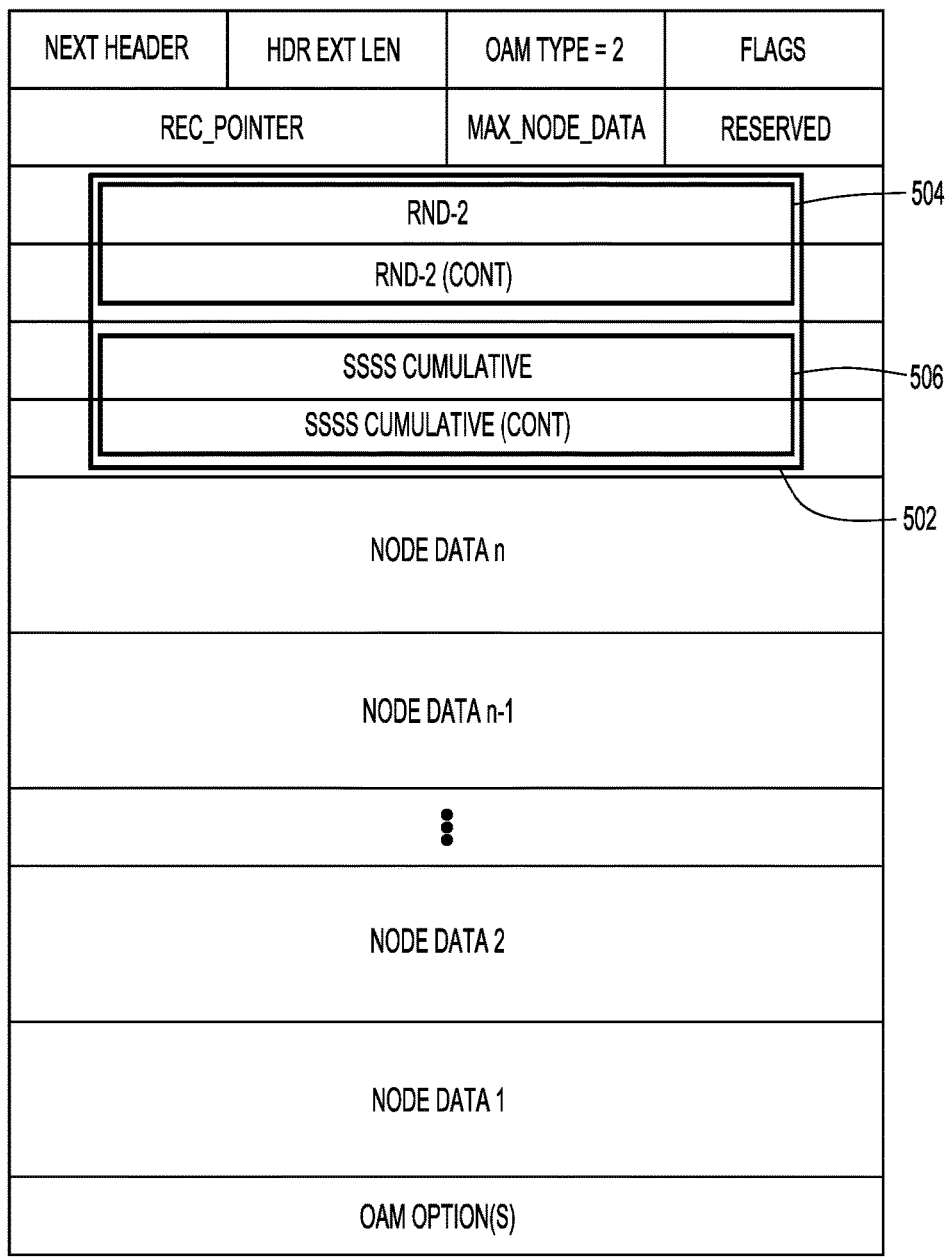
FIG. 11 is a diagram illustrating an example packet header in accordance with an embodiment of the present disclosure.

Referring to FIG. 11, an example OAM IPv6 extension header is shown that contains a metadata field 502 for service chain validation. The metadata field 502 may also be referred to as carrying a proof of transit POT and may include a first field 504 that may contain the RND-2 and a second field 506 that may contain the Shamir's Secret Sharing Scheme (SSSS) cumulative value. Although each of the first field 904 and second field 906 is shown to be 64 bits, this bit length is just an example. In other embodiments, the RND-2 field and SSSS cumulative field may have different bit lengths, for example, 32, 56, 72, 128, etc. It should be noted that in the figures showing the header information, such as, FIGS. 11, 12, 13B, 13C and 14, a field may be split into two lines and the second line being a continuation of the first line. For example, the RND-2 field 504 includes a first line of RND-2 and a continuing second line represented as RND-2 (CONT). Similarly, the SSSS Cumulative field 506 includes a first line of SSSS Cumulative and a continuing second line of represented as SSSS Cumulative (CONT).

Figure 12:
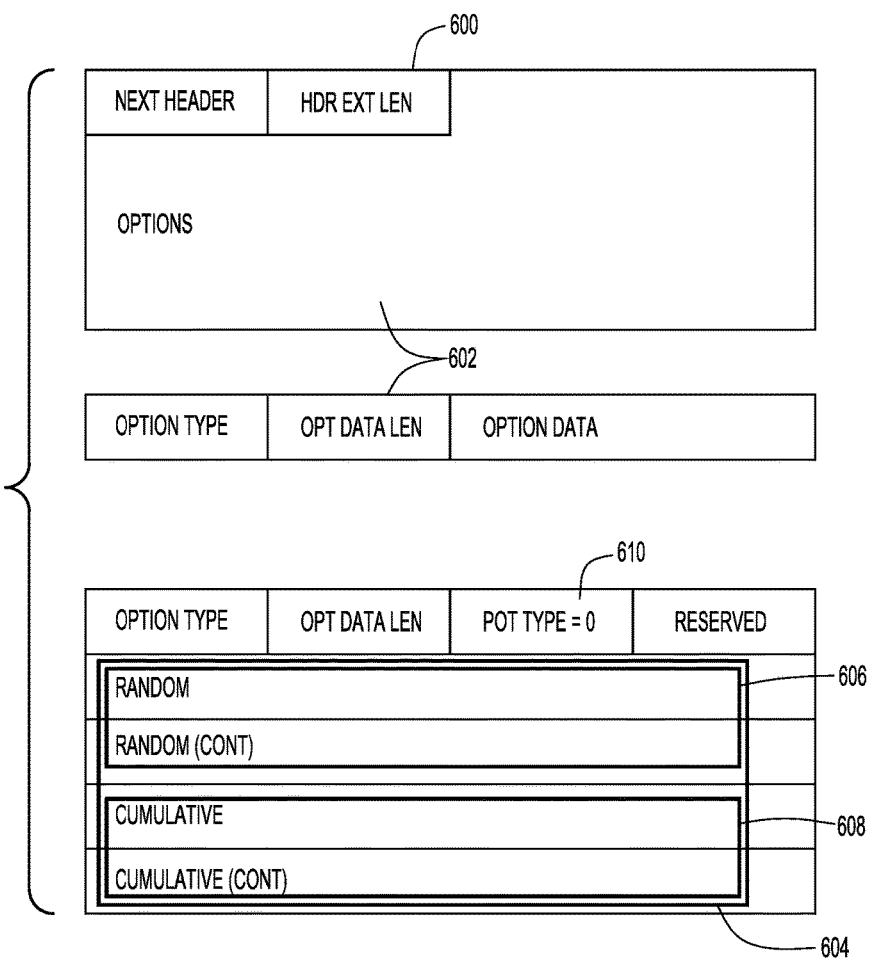
FIG. 12 is a diagram illustrating another example packet header in accordance with an embodiment of the present disclosure.

Referring to FIG. 12, an example OAM Options header 600 is shown that generally depicts how a metadata field 602 may be carried by the header for service chain validation. The Options header 600 may comprise a Next Header field, a Hdr Ext Len field and an Options field as defined in Internet Engineering Task Force (IETF) Request for Comments (RFC) 2460. For example, the OAM Options header 600 may be a Hop by Hop extension header or a Destination extension header as described in RFC 2460.

The Options field 602 may comprise an Option Type, Opt Data Len and Option Data. The Option Data may comprise a metadata field 604. The metadata field 604 may comprise a random number field 606 and a cumulative value field 608. The random number field 606 may contain the RND-2 and the cumulative value field 608 may contain the Shamir's secret sharing scheme (SSSS) cumulative value. The Option Data may also comprise a POT Type field 610, which may indicate that POT data is included. In one embodiment, the POT Type field 610 may be an 8-bit identifier of a particular POT variant to dictate that the POT data is included. The bit length for the POT Type field, reserved field, the random number field 606 and the cumulative value field 608 are merely examples and these fields may have different bit lengths in other embodiments.

Figure 13A:
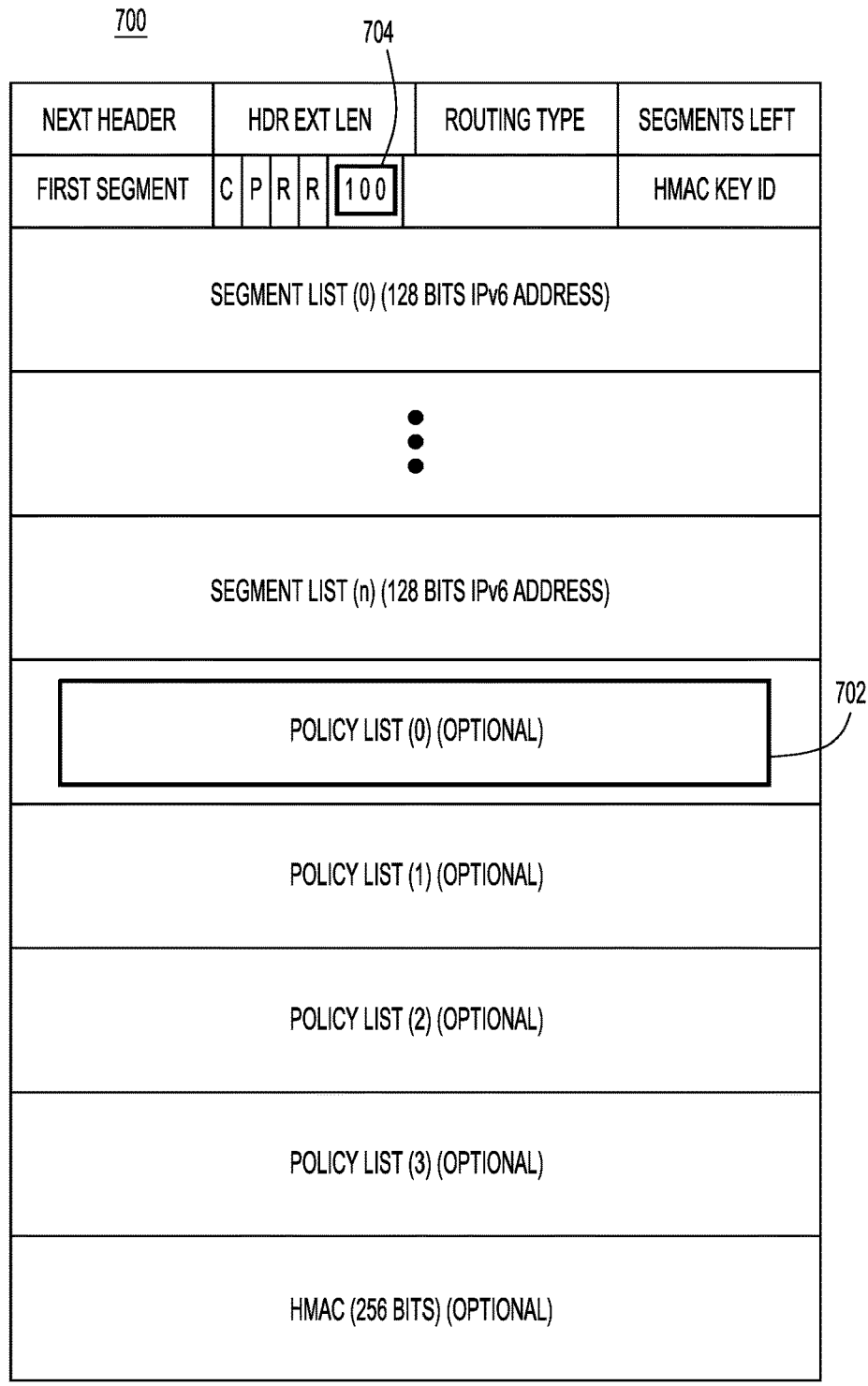
FIG. 13A is a diagram illustrating an example packet header in accordance with an embodiment of the present disclosure.

Referring to FIG. 13A, an example Segment Routing Extension header 700 is shown that generally depicts how a metadata field 702 may be carried by the header for service chain validation. Segment routing is being standardized by the IETF. Description for segment routing extension may be found on IETF website (such as https://tools.ietf.org/html/draft-previdi-6man-segment-routing-header-07#section-5.2). In one embodiment, the service chain validation data may be encoded as a Policy List element in the segment routing header and a new policy type may be used to represent the service chain validation data as a policy list element. The Policy Flags may indicate the index of this data in the policy list. FIG. 13A shows that policy flags bits 4-6, which indicate the type of the first element after the segment list, are marked as a policy flag field 704 and contain a value of 0x04. The service chain validation data is encoded as the optional Policy List [0] indicated by the reference numeral 702. The value of the new policy type has not yet been determined and the value 0x04 is used as the value of the new policy type for illustration purpose. It should be noted that the POT data does not need to be the first policy in the policy list and corresponding policy flag bits may be set if the POT data is at Policy List [1], Policy List [2], or Policy List [3].

Figure 13B:
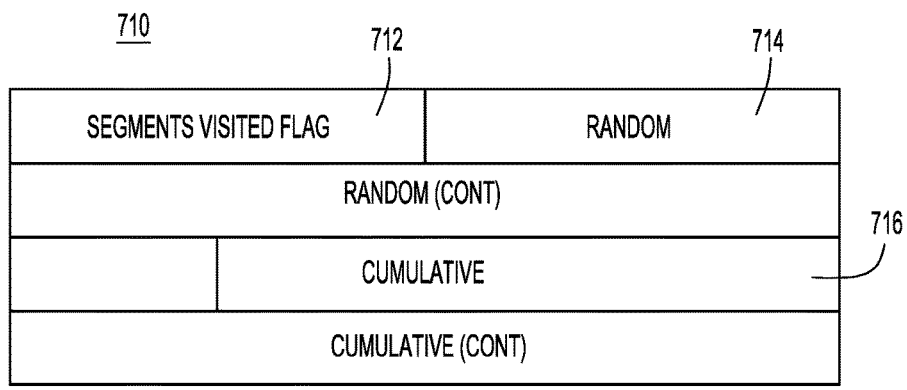
FIG. 13B is a diagram illustrating an example metadata field in the packet header of FIG. 11A, in accordance with an embodiment of the present disclosure.

Referring to FIG. 13B, an example metadata field 710 for the Segment Routing Extension header 700 is shown. The example metadata field 710 may comprise a segments visited flag field 712 at octets 0 and 1, a random number field 714 at octets 2 to 8, and a cumulative field at octets 9-15. The segments visited flag field may indicate whether a segment has been visited (bit set) or not (bit not set). The random number field may contain the random number value for the service chain validation, for example, RND-2. The cumulative field may contain the cumulative value for the service chain validation, for example, SSSS cumulative value.

Figure 13C:
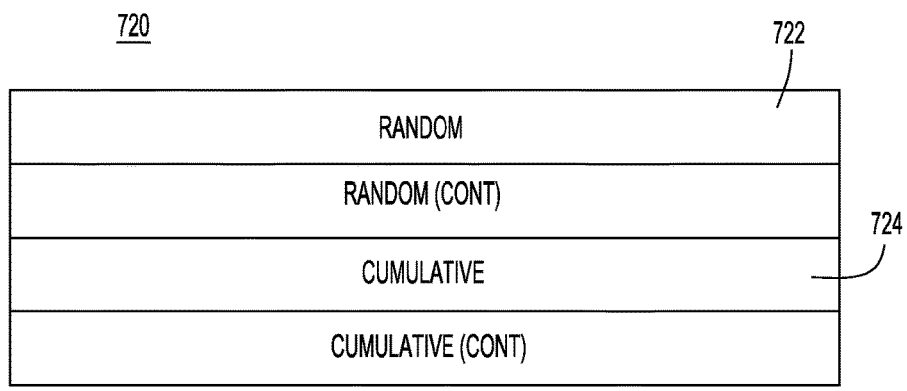
FIG. 13C is a diagram illustrating another example metadata field in the packet header of FIG. 11A, in accordance with an embodiment of the present disclosure.

Referring to FIG. 13C, another example metadata field 720 for the Segment Routing Extension header 700 is shown. As shown in FIG. 13C, the example metadata field 720 may comprise a random number field 722 at octets 0 to 7 and a cumulative field 724 at octets 8-15. Other than that the sizes are different from their counterparts of the example metadata field 710, the random number field 722 and the cumulative field 724 of the example metadata field 720 may be similar to their counterparts in the example metadata field 710, and may contain the random number value and the cumulative value for the service chain validation, respectively.

Figure 14:
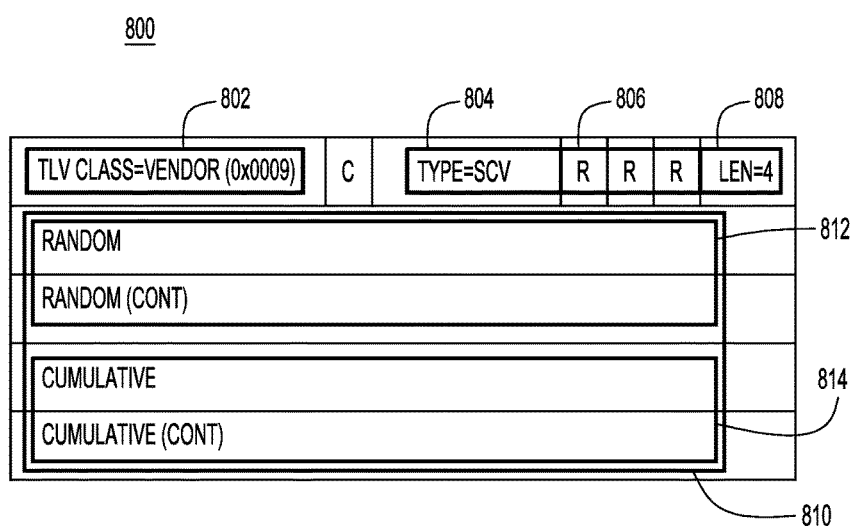
FIG. 14 is a diagram illustrating yet another example packet header in accordance with an embodiment of the present disclosure.

Referring to FIG. 14, an example NSH MD-type 1 header 800 is shown that contains a metadata field that carries POT data. The header 800 may comprise a TLV Class field 802, a type field 804, a reserved bits field 806, a length field 808 and a metadata field 810. The TLV Class field 802 may contain information that describes the scope of the type field 804. In some cases, the TLV Class may identify a specific vendor; in others, the TLV Class may identify specific standards body allocated types. In one embodiment, POT may be defined within a specific vendor TLV class, such as but not limited to, a vendor with a value of 0x0009, and represented as a Vendor (0x0009) TLV class. The type field 804 may contain type information to indicate the specific type of information being carried by the metadata field 810. The type information may be defined within the scope of a given TLV Class. In some embodiments, value allocation may be the responsibility of the TLV Class owner. For example, a tentative number of 0x94 may be selected for the type value for service chain validation (SCV). The reserved bits field 806 may contain reserved bits, for example, three reserved bit may be present for future use. In one embodiment, the reserved bits are be set to 0x0. The length field 808 may contain the length of the variable metadata, for example, in 4-byte words. In the embodiment shown in FIG. 14, the length is 4.

The metadata field 810 may comprise a random number field 812 and a cumulative number field 814. The random number field 812 may comprise a per packet random number, for example, a 64-bit RND-2. The cumulative number field 814 may comprise a cumulative number updated at each network node, for example, a 64-bit cumulative that is updated at the network nodes by processing per packet random number field and network node specific parameters.

The metadata fields in the various embodiments for headers in FIGS. 11-14 use the random and cumulative fields to illustrate how verification information may be carried in a packet header. The verification information may also be referred to as validation information or POW data. The metadata fields are not limited to contain only the random and cumulative fields, however. For example, as described above, in some embodiments using the secret sharing method, each network node may put their respective shares of POLY-3 into the metadata field instead of the cumulative value. In these embodiments, the metadata field may contain the RND-2, and a plurality of fields for the respective shares of POLY-3 generated by the respective services along the path. Also, in the embodiments using cryptographic operations based on cryptographic keys, the metadata field may contain a RND field, a SEQ field, and a VERIFY field.

Still further examples of how the metadata may be carried include in an additional tunnel header according to any of a variety of tunneling schemes now known or hereinafter developed, as well as carrying the metadata as a "pseudo label", such as in Multiprotocol Label Switching (MPLS) forwarding. In general, the proof of transit/verification metadata may be carried in either an existing or new tunnel/encapsulation header. That is, a new tunnel/encapsulation header may be created to carry that type of metadata, or existing fields in a tunnel/encapsulation header may be repurposed to carry the metadata.

Thus, in summary, a method is provided comprising: obtaining information about a packet at a network node in a network, the information including in-band metadata; reading verification information from the in-band metadata; generating updated verification information from the verification information read from the packet, the verification information for use in verifying a path of the packet in the network; writing the updated verification information to the in-band metadata of the packet; and forwarding the packet from the network node in the network. The in-band metadata may be carried in a variety of ways, such as: as an option in an IPv6 extension header; in a destination options IPv6 extension header; an option of a hop-by-hop IPv6 extension header; as part of a routing options IPv6 extension header; as an IPv6 extension header used for segment routing; as an IPv6 extension used for Operation, Administration and Maintenance (OAM); as a tunnel header, as a pseudo label, or in an extension header of a Network Service Header. The verification information may comprise a cumulative value of a secret sharing scheme.

In another form, an apparatus is provided comprising: a network interface unit configured to enable communications over a network; a processor coupled to the network interface unit, wherein the processor is configured to: obtain information about a packet received at the network interface unit, the information including in-band metadata; read verification information from the in-band metadata; generate updated verification information from the verification information read from the packet, the verification information for use in verifying a path of the packet in the network; write the updated verification information to the in-band metadata of the packet; and cause the packet to be forwarded in the network via the network interface unit.

Further still, a system is provided comprising: a plurality of network nodes associated with a path in a network, each network node configured to: obtain information about a packet received at the network interface unit, the information including in-band metadata; read verification information from the in-band metadata; generate updated verification information from the verification information read from the packet, the verification information for use in verifying a path of the packet in the network; write the updated verification information to the in-band metadata of the packet; and forward the packet in the network.

Block Diagrams of Participating Equipment

Figure 15:
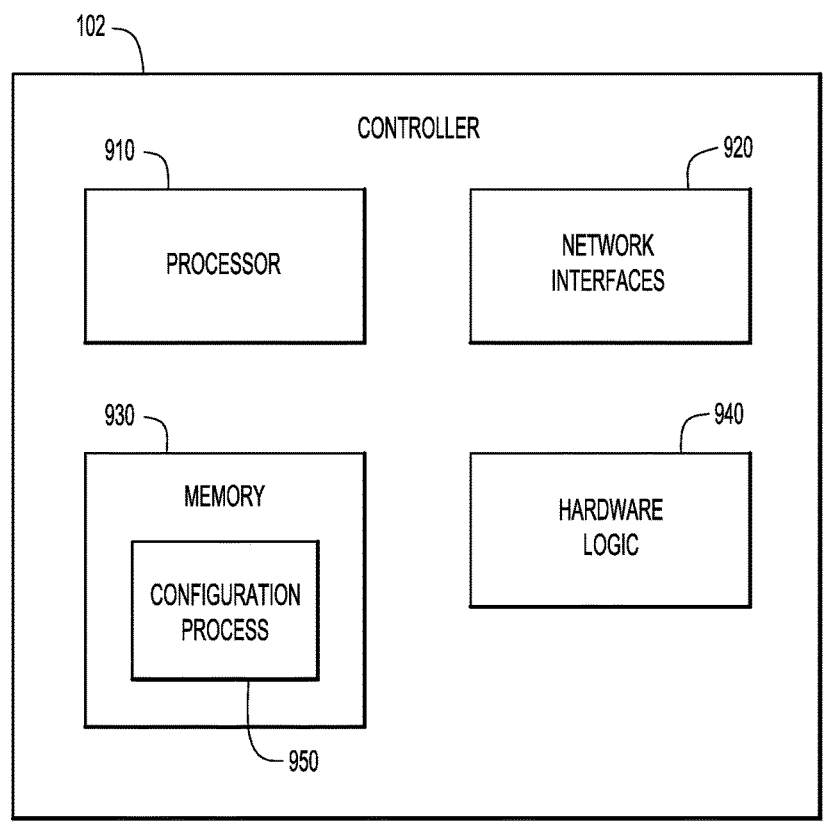
FIG. 15 is a block diagram of a controller in accordance with an example embodiment.

With reference to FIG. 15, there is an illustration of an example architecture of a device configured to perform functions of a controller (e.g., the controller 102 shown in FIG. 1). The controller 102 can take the form of a server, such a network management system, for example, that can generate the configuration information described herein and distribute the information to the network nodes (and to the verifier node). The controller 102 may comprise a processor 910, one or more network interface units (e.g., network interface cards) 920, a memory 930 and hardware logic 940. Resident in the memory 330 is software for a configuration process 950, which may include operations to define and configure a plurality of network nodes of a desired path to be verified, and to generate and send verification information to the network nodes of the path as described above. Process 950 may also be implemented in hardware using hardware logic 940, or be implemented in a combination of both hardware and software.

The processor 910 is, for example, a microprocessor, a microcontroller, systems on a chip (SOCs), or other fixed or programmable logic. The processor 910 is also referred to herein simply as a processor. The memory 930 may include read only memory (ROM), random access memory (RAM), magnetic disk storage media devices, tamper-proof storage, optical storage media devices, flash memory devices, electrical, optical, or other physical/tangible memory storage devices. The memory 930 may be separate or part of the processor 910. Thus, in general, the memory 930 may include one or more tangible (e.g., non-transitory) computer readable storage media (e.g., a memory device) encoded with software comprising computer executable instructions and when the software is executed (by the processor 910) it is operable to perform the operations described herein in connection with the controller 102 in the network for the service chain. To this end, the memory 930 may store software instructions that, when executed by the processor 910, cause the processor 910 to perform a variety of configuration operations including defining the network path and configuring the network nodes with configuration information as described herein. For example, the memory 930 may store instructions for the processor 910 to perform the operations described above in connection with FIGS. 3 and 10.

The network interfaces 920 enable communication over a network with network nodes in a network as shown in FIG. 1. As such, the network interfaces 920 may include one or more communication network interface cards with ports configured to receive/send packets from/to the network. The network interfaces may include wired and/or wireless network connectivity.

The functions of the processor 910 may be implemented by a processor or computer readable tangible non-transitory medium encoded with instructions or by logic encoded in one or more circuits (e.g., embedded logic such as an application specific integrated circuit (ASIC), digital signal processor (DSP) instructions, software that is executed by a processor, etc.), wherein the memory 930 stores data used for the computations or functions described herein (and/or to store software or processor instructions that are executed to carry out the computations or functions described herein). Thus, functions of the process 950 may be implemented with fixed logic or programmable logic (e.g., software or computer instructions executed by a processor or field programmable gate array (FPGA)).

Hardware logic 940 may be used to implement certain functions (e.g., cryptographic operations such as generating cryptographic keys) and perform hardware programming, e.g., at an ASIC level, without involving a Central Processing Unit (CPU), e.g., processor 910, or a separate processor associated with one of the network interfaces 920. The hardware logic 940 may be coupled to processor 910 or be implemented as part of processor 910. In some embodiments, the hardware logic 940 may also include one or more application specific integrated circuits that include buffers, queues, and other control logic for performing packet forwarding operations.

It should be appreciated that in other embodiments, the controller 102 may include fewer or more modules apart from those shown in FIG. 15. In another example, the configuration process 950 may be in the form of firmware that is processed by ASICs, which may be integrated into a circuit board. Alternatively, the configuration process 950 may be in the form of one or more logic blocks included in a programmable logic device (e.g., a field-programmable gate array). Moreover, the controller 102 may be adapted, and/or additional structures may be provided, to provide alternative or additional functionalities beyond those specifically described herein. Modifications or additions to the structures described in relation to FIG. 15 to implement these alternative or additional functionalities are envisioned without departing from the scope and spirit of the embodiments presented herein.

Figure 16:
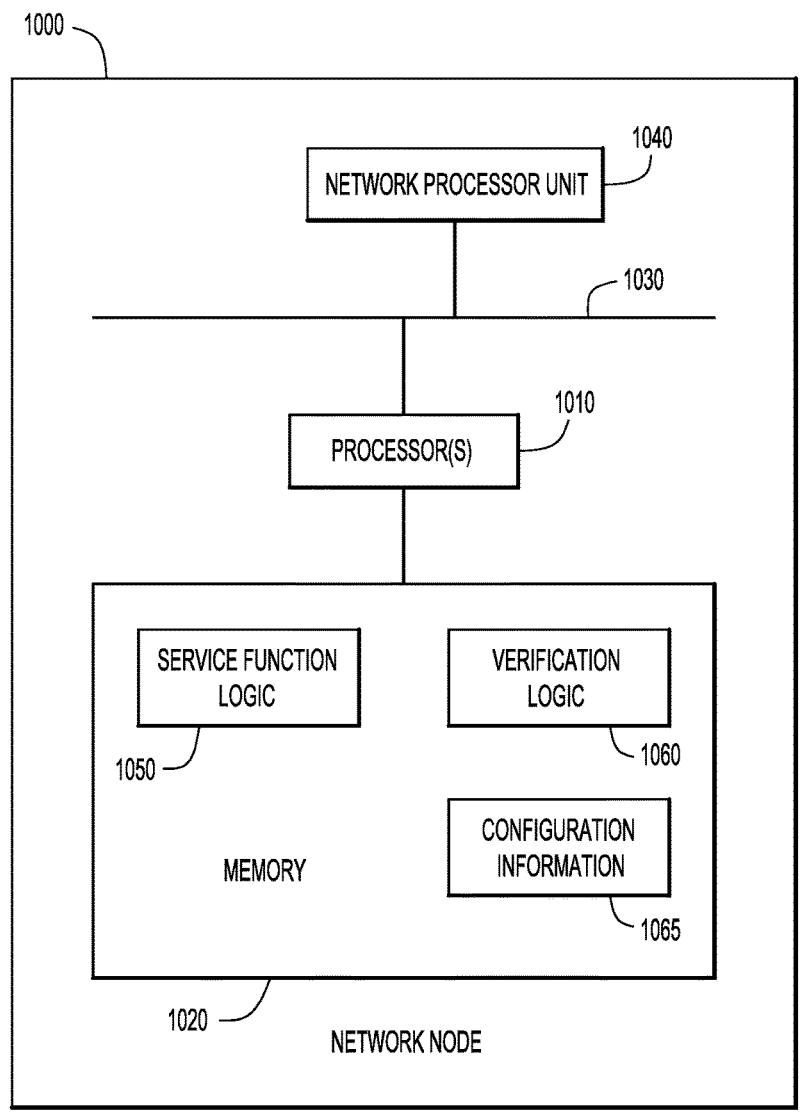
FIG. 16 is a block diagram of a network node in accordance with an example embodiment.

Turning now to FIG. 16, an example block diagram is shown of a network node 1000, e.g., any of the network nodes 120, 130, 132, 134 and 140) shown in FIG. 1. The network node 1000 includes one or more processors 1010, memory 1020, a bus 1030 and a network processor unit 1040. The processor 1010 may be a microprocessor or microcontroller. The network processor unit 1040 may include one or more ASICs and facilitates network communications between the network device 1000 and other network nodes as well as the controller 102, and includes a plurality of network ports (not shown) from which to receive packets in a network and to which it routes packets into the network. The processor 1010 executes instructions associated with software stored in memory 1020. Specifically, the memory 1020 stores instructions for service function logic 1050 that, when executed by the processor 1010, causes the processor 1010 to perform operations for one or more service functions. The memory 1020 also stores instructions for verification logic 1060 that, when executed, causes the network node to read verification information from the in-band metadata, generate updated verification information and write the updated verification information back to the in-band metadata, based on configuration (validation) information 1065 received from the controller, according to the operations described herein, and the more specific embodiments for the cryptographic related operations described herein. It should be noted that in some embodiments, the verification logic 1060 may be implemented in the form of firmware that is processed by ASICs, which may be integrated into a circuit board. Alternatively, the verification logic 1060 may be in the form of one or more logic blocks included in a programmable logic device (e.g., a field-programmable gate array). In particular, as described herein, some components of the network device 400 may provide hardware support of computation intensive cryptographic operations.

The memory 1020 may include ROM, RAM, magnetic disk storage media devices, tamper-proof storage, optical storage media devices, flash memory devices, electrical, optical, or other physical/tangible memory storage devices. In general, the memory 1020 may comprise one or more tangible (non-transitory) computer readable storage media (e.g., a memory device) encoded with software comprising computer executable instructions and when the software is executed (by the processor 1010) it is operable to perform the operations described herein.

Figure 17:
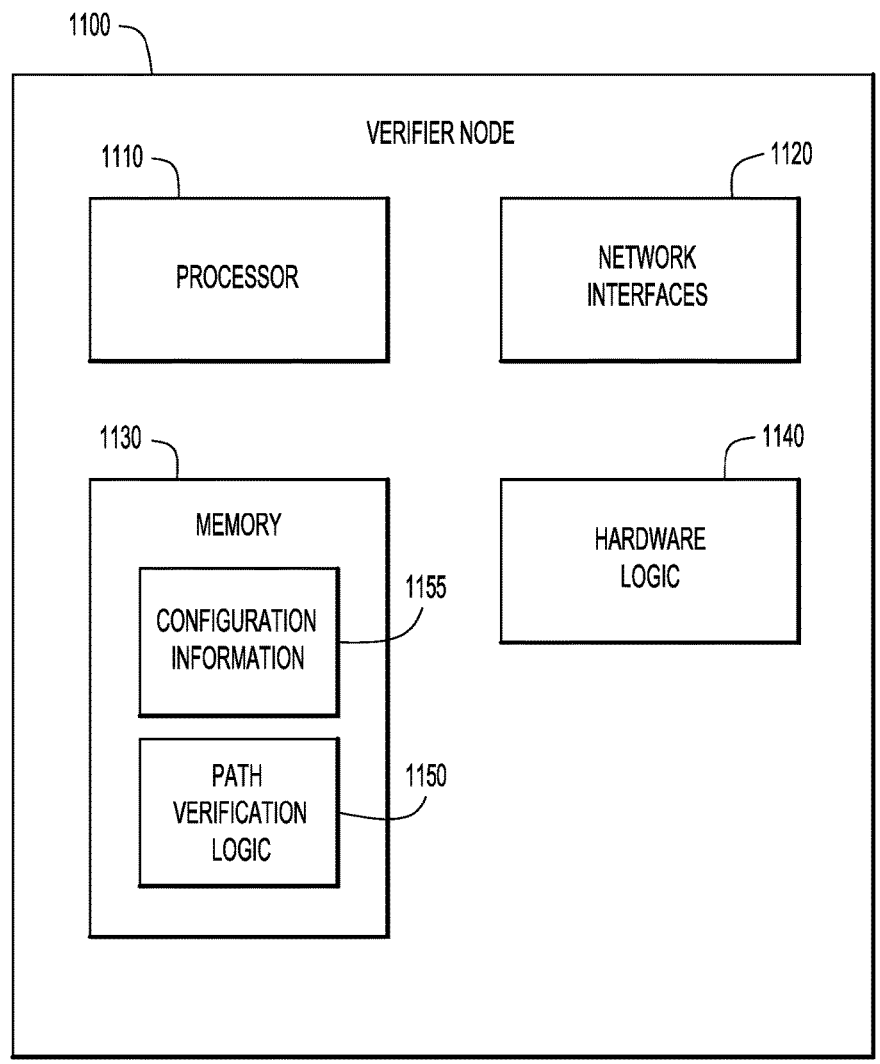
FIG. 17 is a block diagram of an egress node in accordance with an example embodiment.

With reference to FIG. 17, there is an illustration of an example block diagram of a network node configured to serve as an egress node (e.g., verifier), such as the egress node 140 shown in FIG. 1 or egress node 310 shown in FIG. 7. The verifier (egress) network node shown at reference numeral 1100 may comprise a processor 1110, one or more network interfaces 1120, a memory 1130 and hardware logic 1140. Resident in the memory 1130 is software for a path verification process 1150 which may include operational processes described above, and is further described below in connection with FIGS. 4 and 9. In addition, the memory 1150 stores configuration information 1150 received from the controller, and corresponding to all of the configuration (validation) information that the controller sent to each individual network node in a path to be verified. Some or all operations of path verification process 1150 may also be implemented in hardware using hardware logic 1140 (e.g., ASIC or FPGA), or be implemented in a combination of both hardware and software. The network interfaces 1120 may be network ports that can send and receive packets in a network, and thereby enable any network nodes coupled to the network device 1100 to communicate over the network as shown in FIG. 1.

The operations and logic described herein may be implemented in any form, in addition to software that is executed by a processor. For example, in one embodiment, the operations and logic may be implemented in the form of firmware that is processed by ASICs, which may be integrated into a circuit board. In another embodiment, the operations and logic may be implemented in the form of one or more logic blocks included in a programmable logic device (e.g., a field-programmable gate array). Therefore, as described herein, the techniques presented herein may be embodied in a method, an apparatus and computer readable storage media, for example.

Embodiments described herein may enable verification that certain network traffic has traveled through a particular path in a network. One example is when an institution deploys a service chain to check whether all packets that are supposed to traverse the service chain actually traversed it. Indirect proofs of a service chain are no longer required. Further, inspecting every packet may also reveal that service chaining methods may be flow-based, where only the first packet of a flow traverses the entire service inspection and the remaining packets of a flow follow a short-cut based on a simplified policy.

Embodiments of the present disclosure provide various benefits over any conventional methods. For example, the intermediate network nodes only know their secret or share of the secret. In addition, this solution is flexible in terms of multiple nodes implementing a service and the order of services a packet visits. For example, a service could be implemented by multiple devices, such as, load balancing across several firewalls implementing the same policy, and all of the devices which implement the same service would use the same share of the secret or the same secret (in case a set of secrets is used). The path validation will work independently of the order of network nodes a packet goes through. As long as the network nodes that are to be enforced are part of the path and the packet goes through of those network nodes, the verification will succeed.

Moreover, as long as a unique random number/time stamp for each packet is used for RND-2, embodiments of the present disclosure can avoid replay attacks. Also, because a verifier also has a part in the combination of secrets step, nodes cannot be bypassed.

Another aspect of the embodiments presented herein is that very limited configuration is required because a path is described by either a single secret (in case secret sharing is used) or a set of secrets. Yet another advantage is that it may require only a limited amount of metadata, for example, a cumulative key of 64 bits may be sufficient.

For embodiments that implement the validation by the secret sharing, there are other beneficial characteristics: 1) Shamir's secret sharing is polynomial math and much faster than approaches based on nested cryptographic hashes etc., 2) low complexity: the computation at each node (with one time pre-computed values) consists of three additions and a multiplication operation, the computation at the verifier is a subtraction followed by comparison with SSEC for verification, and the operations can be further optimized by using Galois Field (GF field or finite field) based addition, multiplication for split and combine of the polynomials; and 3) it is possible to verify which path the packet has passed through at egress by configuring each path (e.g., service chain) with a unique secret (RND-1).

In some embodiments, multiple RND-1's may be pre-configured into network nodes and each packet may be configured to carry a piece of metadata information to identify which RND-1 share should be used for this packet. In one embodiment, a deterministic function of RND-2 may be used to determine an index to the RND-1. For example, the last byte of the RND-2 may be converted to a number and used to determine which RND-1 share should be used for the packet. These embodiments may prolong the renewal cycles of RND-1 and reduce the workload on the controller.

These techniques may provide solid proof that a packet traversed a specific set of network paths of a network path. Moreover, the techniques may allow users to move away from the conventional methods of proving that a service chain is in place for a particular application and may also enable any institutions to leverage NFV for building out their service zones.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining information about a packet at a network node in a network, the information including in-band metadata;
reading a value from the in-band metadata, wherein the value includes a first coefficient for a first zero degree term of a first polynomial that is unique to the packet;
generating an updated value from the value read from the in-band metadata by adding, to the value, a random share of a second coefficient for a second zero degree term of a second polynomial;
writing the updated value to the in-band metadata of the packet; and
forwarding the packet from the network node in the network.

2. The method of claim 1, wherein the in-band metadata is carried in an IPv6 extension header.

3. The method of claim 1, wherein the in-band metadata is carried in a destination options IPv6 extension header.

4. The method of claim 1, wherein the in-band metadata is carried in an option of a hop-by-hop IPv6 extension header.

5. The method of claim 1, wherein the in-band metadata is carried as part of a routing options IPv6 extension header.

6. The method of claim 1, wherein the in-band metadata is carried as an IPv6 extension header used for segment routing.

7. The method of claim 1, wherein the in-band metadata is carried as an IPv6 extension used for Operation, Administration and Maintenance (OAM).

8. The method of claim 1, wherein the in-band metadata is carried as a tunnel header.

9. The method of claim 1, wherein the in-band metadata is carried as a pseudo label.

10. The method of claim 1, wherein the in-band metadata is carried in an extension header of a Network Service Header.

11. An apparatus comprising:
a network interface unit configured to enable communications over a network; and
a processor coupled to the network interface unit, wherein the processor is configured to:
obtain information about a packet received at the network interface unit, the information including in-band metadata;

read a value from the in-band metadata, wherein the value includes a first coefficient for a first zero degree term of a first polynomial that is unique to the packet;

generate an updated value from the value read from the in-band metadata by adding, to the cumulative value, a random share of a second coefficient for a second zero degree term of a second polynomial;

write the updated value to the in-band metadata of the packet; and cause the packet to be forwarded in the network via the network interface unit.

12. The apparatus of claim 11, wherein the in-band metadata is carried in an IPv6 extension header.

13. The apparatus of claim 11, wherein the in-band metadata is carried in part of a routing options IPv6 extension header.

14. The apparatus of claim 11, wherein the in-band metadata is carried as an IPv6 extension header used for segment routing.

15. The apparatus of claim 11, wherein the in-band metadata is carried in an extension header of a Network Service Header.

16. A system comprising:

a plurality of network nodes associated with a path in a network, each network node configured to:

obtain information about a packet received at a network interface unit, the information including in-band metadata;

read a value from the in-band metadata, wherein the value includes a first coefficient for a first zero degree term of a first polynomial that is unique to the packet;

generate an updated value from the value read from the in-band metadata by adding, to the value, a random share of a second coefficient for a second zero degree term of a second polynomial;

write the updated value to the in-band metadata of the packet; and forward the packet in the network.

17. The system of claim 16, wherein the in-band metadata is carried in an IPv6 extension header.

18. The system of claim 16, wherein the in-band metadata is carried in part of a routing options IPv6 extension header.

19. The system of claim 16, wherein the in-band metadata is carried as an IPv6 extension header used for segment routing.

20. The system of claim 16, wherein the in-band metadata is carried in an extension header of a Network Service Header.

\* \* \* \* \*

UNITED STATES PATENT AND TRADEMARK OFFICE
CERTIFICATE OF CORRECTION

PATENT NO. : 10,211,987 B2
APPLICATION NO. : 14/992114
DATED : February 19, 2019
INVENTOR(S) : Venkata Krishna Sashank Dara et al.

Page 1 of 1

It is certified that error appears in the above-identified patent and that said Letters Patent is hereby corrected as shown below:

In the Claims

Claim 11, Column 27, Line 5, replace "to the cumulative value" with --to the value--

Signed and Sealed this
Twenty-sixth Day of March, 2019

Andrei Iancu
*Director of the United States Patent and Trademark Office*